(12) United States Patent
Fang

(10) Patent No.: US 12,555,097 B2
(45) Date of Patent: Feb. 17, 2026

(54) FIAT-CRYPTO ONRAMP

(71) Applicant: STRIPE, INC., South San Francisco, CA (US)

(72) Inventor: Sen Fang, San Francisco, CA (US)

(73) Assignee: STRIPE, LLC, San Franisco, CA (US)

( * ) Notice: Subject to any disclaimer, the term of this patent is extended or adjusted under 35 U.S.C. 154(b) by 12 days.

(21) Appl. No.: 17/986,783

(22) Filed: Nov. 14, 2022

(65) Prior Publication Data

US 2024/0161090 A1    May 16, 2024

(51) Int. Cl.
*G06Q 20/36* (2012.01)

(52) U.S. Cl.
CPC ..... *G06Q 20/3674* (2013.01); *G06Q 20/3678* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 2010/0082477 | A1* | 4/2010 | Huston | G06Q 40/03 705/38 |
| 2015/0220892 | A1* | 8/2015 | Allen | G06Q 20/3829 705/37 |
| 2019/0332691 | A1 | 10/2019 | Beadles et al. | |
| 2020/0042996 | A1* | 2/2020 | Mayblum | G06Q 20/10 |
| 2020/0160344 | A1* | 5/2020 | Jevans | G06Q 20/065 |
| 2021/0004791 | A1* | 1/2021 | Liu | G06Q 20/0655 |
| 2021/0012325 | A1* | 1/2021 | Harish | G06Q 20/38215 |
| 2023/0047509 | A1* | 2/2023 | Dhodapkar | G06Q 20/24 |
| 2024/0013212 | A1* | 1/2024 | Shamai | G06Q 20/3825 |

FOREIGN PATENT DOCUMENTS

WO    WO-2020104961 A1 *    5/2020

OTHER PUBLICATIONS

Wyre, Smart Ramps, Introducing: SmartRamps by Wyre, https://blog.sendwyre.com/gm-2d6b72ba0df3, 4 pages, accessed Nov. 14, 2022.

* cited by examiner

*Primary Examiner* — Patrick Mcatee
*Assistant Examiner* — Jason B Fenstermacher
(74) *Attorney, Agent, or Firm* — Foley & Lardner LLP

(57) ABSTRACT

A proxy cryptocurrency wallet configured to: receive a pre-authorization from a user cryptocurrency wallet, the pre-authorization corresponding to a transaction requested to be executed and specifying a digital asset to purchase and a price denominated in a cryptocurrency, the user cryptocurrency wallet being configured to allow for a pre-authorization of the transaction without a sufficient amount of cryptocurrency required for the transaction being present in the user cryptocurrency wallet; in response to receiving the pre-authorization, identify if an amount of cryptocurrency in the proxy cryptocurrency wallet is sufficient to execute the transaction; and in response to identifying that the amount of cryptocurrency in the proxy cryptocurrency wallet is sufficient to execute the transaction, execute the transaction resulting in a purchase of the digital asset and a transfer of the digital asset to a recipient cryptocurrency wallet, the recipient cryptocurrency wallet being different from the proxy cryptocurrency wallet.

20 Claims, 8 Drawing Sheets

FIAT-CRYPTO ONRAMP

BACKGROUND

Cryptocurrencies such as Bitcoin and Ether are digital currencies that store transaction and ownership on a digital ledger using distributed ledger technology, typically in the form of a blockchain. In contrast to traditional currencies such as the United States dollar, the euro, and the Japanese yen, these cryptocurrencies generally do not rely on a central authority, such as a decree from a government or a guarantee from a bank, to be designated as legal tender. As used herein, the term fiat money may be used to refer to currencies other than cryptocurrencies, without regard to whether those currencies are backed by a commodity such as a precious metal. The digital ledger may also be used to track transactions involving the exchange of digital assets other than cryptocurrencies. Examples of such digital assets include non-fungible tokens (NFTs) and other digital tokens for use in some types of distributed applications. A cryptocurrency exchange is a type of business that allows its customers to trade cryptocurrencies or digital currencies for other assets, or vice versa, such as by purchasing cryptocurrency using fiat currency.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to systems and methods for initiating transactions on a blockchain, such as to purchase digital assets, substantially as shown in and/or described in connection with at least one o the figures, as set forth more completely in the claims.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

Figure 1:
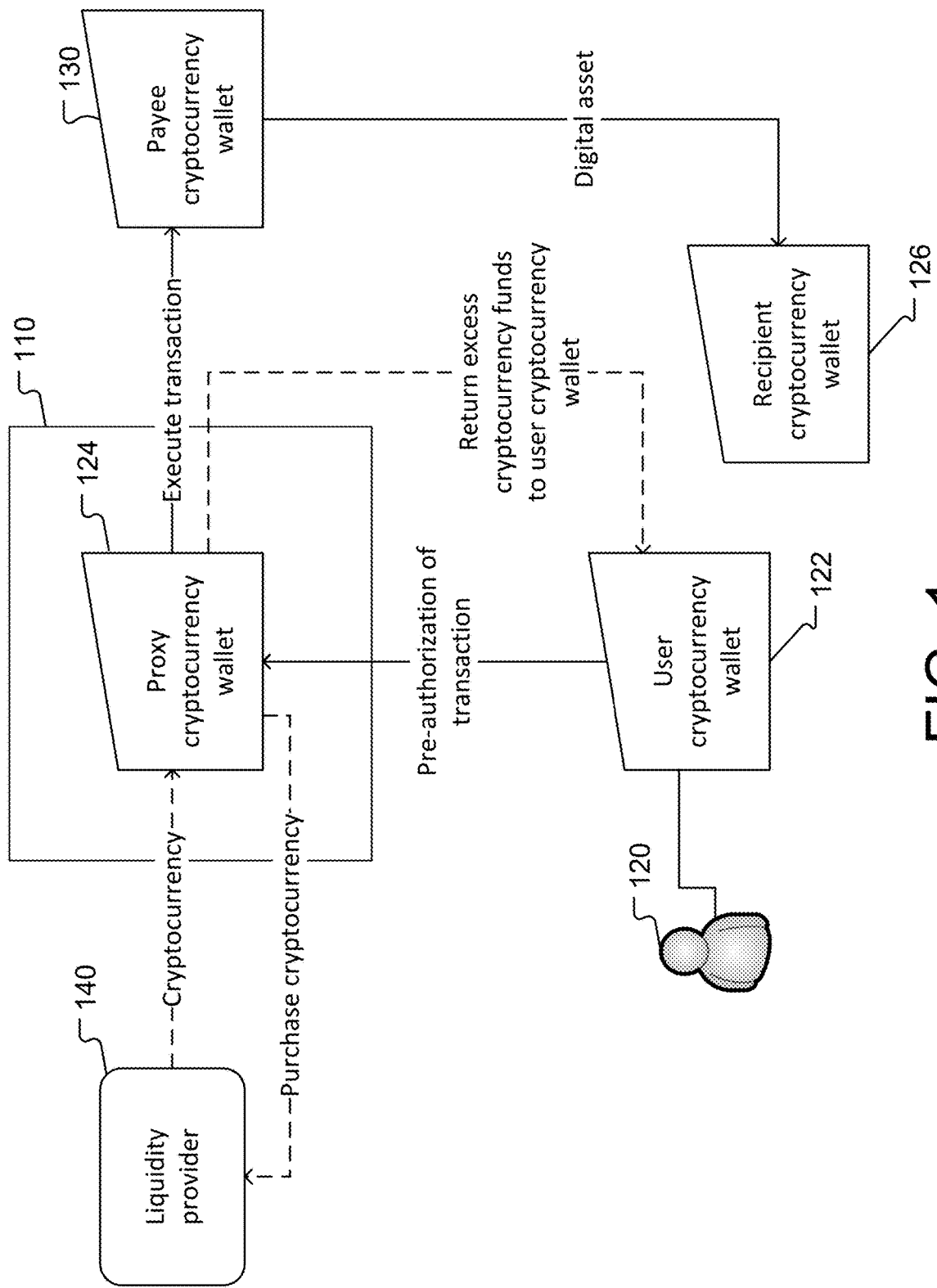
FIG. 1 is a block diagram depicting interactions between a user and a proxy cryptocurrency wallet according to one embodiment of the present disclosure configured to assist in the process of purchasing a digital asset.

In the following detailed description, only certain exemplary embodiments of the present disclosure are shown and described, by way of illustration. As those skilled in the art would recognize, the disclosure may be embodied in many different forms and should not be construed as being limited to the embodiments set forth herein. Like reference numerals designate like elements throughout the specification.

Aspects of embodiments of the present disclosure relate to initiating blockchain transactions using cryptocurrency, including proxy cryptocurrency wallets to assist in purchasing digital assets when a user cryptocurrency wallet may have insufficient funds to complete the transaction and permissions associated with the user cryptocurrency wallet that constrain the circumstances in which the proxy cryptocurrency wallet is permitted to execute transactions on behalf of the user cryptocurrency wallet.

A cryptocurrency wallet is a device, physical medium, program or a service that stores public and/or private keys of a public-private key pair of a public-key cryptographic system. Generally, a user may establish a cryptocurrency wallet by generating such a public-private key pair and publishing the public key. The public key associated with the cryptocurrency wallet may be used to specify the cryptocurrency wallet as recipient of cryptocurrency, e.g., where the public key may be used as an address identifying the cryptocurrency wallet. For example, a user may make use of a liquidity provider or cryptocurrency exchange to pay fiat currency in exchange for having the cryptocurrency exchange deposit cryptocurrency into the user's cryptocurrency wallet by recording a transaction on the distributed ledger or public blockchain with the wallet address (e.g., public key) of the user's cryptocurrency wallet as the recipient of the funds. A user who possesses the private key associated with a cryptocurrency wallet can use the private key to sign a transaction associated with that cryptocurrency wallet and record the signed transaction on the distributed ledger. Signing the transaction may also be referred to as authorizing the transaction. Other users can verify the authenticity of the transaction (e.g., verify that it was signed using the private key associated with that cryptocurrency wallet) using the public key associated with the cryptocurrency wallet.

Various parties within the cryptocurrency ecosystem may require payment for goods and services (herein more generally referred to as "digital assets") using cryptocurrencies.

For example, an artist may create (or mint) a limited number of non-fungible tokens (NFTs) associated with a particular piece of art or other media. Individual users may purchase these NFTs to support the artist, where the artist may require that the NFT be purchased using a particular cryptocurrency (e.g., Bitcoin or Ether). For example, a user may send an appropriate amount of the cryptocurrency (e.g., set by the artist) to a payee cryptocurrency wallet (e.g., associated with a party selling the digital asset or associated a smart contract controlling the distribution of the digital asset), and the payee cryptocurrency wallet (or other wallet) may record a transaction recording the transfer of ownership of the NFT to a recipient cryptocurrency wallet (e.g., the user's cryptocurrency wallet).

As another example, a decentralized autonomous organization (DAO) or decentralized autonomous corporation (DAC) is a type of organization that manages voting powers in accordance with the ownership of tokens associated with the DAO, where the ownership of tokens may be publicly recorded in a distributed ledger (e.g., a public blockchain). Individuals or users may purchase tokens associated with the DAO by interacting with a smart contract (e.g., sending a payment to a cryptocurrency wallet associated with the smart contract), where cryptocurrency is transferred to a wallet associated with the DAO and digital tokens are provided to a recipient specified by the purchaser. Holders of these digital tokens may then interact with the DAO based on its internal rules, such as voting on actions to be taken by the DAO (where voting power is based on the number of digital tokens held) or exchanging the digital tokens for services provided by the DAO (e.g., data storage, use of computing resources, and the like).

In these examples, a user may not have a cryptocurrency wallet that holds sufficient funds in the form of the cryptocurrency demanded by the transactional counterparty (e.g., artist or the DAO). Therefore, as a prerequisite to engaging in the desired cryptocurrency transaction (e.g., of obtaining an NFT or a digital token of the DAO), the user must first purchase the appropriate cryptocurrency using fiat currency (e.g., Euros, United States Dollars, or Japanese Yen), other conventional currencies, or using another cryptocurrency (e.g., purchasing Ether using USD Coin).

These initial purchases of cryptocurrencies can be complex and may be confusing for newcomers to the cryptocurrency ecosystem. For example, there is often a long delay between initiating a transaction to purchase cryptocurrency using fiat currency and eventually receiving the purchased cryptocurrency (e.g., from tens of minutes to several hours to several days, depending on the structure of the transaction). Furthermore, the initial purchase of cryptocurrency is typically performed through a different service or website than that initially engaged in by the user. For example, a user may visit a website associated with an artist or a DAO, but they may need to visit a different website associated with a cryptocurrency exchange or cryptocurrency liquidity provider to purchase the cryptocurrency needed to complete the purchase of the digital asset.

In addition, the delay before receiving the cryptocurrency may require the user to pause their process of purchasing the digital asset and resume the purchase process only after they have received the purchased cryptocurrency. This delay, confusion, and poor integration can often lead to user drop-off and abandonment of the purchase, thereby making it difficult for entities in the cryptocurrency ecosystem to make sales using cryptocurrency, especially when working with consumers who are new to cryptocurrency transactions.

Therefore, aspects of embodiments of the present disclosure relate to systems and methods that simplify processes for purchasing digital assets. In some examples, these systems and methods include a proxy cryptocurrency wallet that can act on behalf of a user. In some examples, a user provides a pre-authorization of a transaction to a proxy cryptocurrency wallet, where the transaction specifies the digital asset to be purchased, a price to be paid (e.g., denominated in a cryptocurrency), and a payee cryptocurrency wallet (e.g., a payee wallet address). The pre-authorization may take the form of having the transaction signed by a user cryptocurrency wallet, where the user cryptocurrency wallet may lack sufficient funds to complete the transaction (e.g., a balance of cryptocurrency funds may be lower than the price indicated in the transaction). The proxy cryptocurrency wallet may also automatically purchase cryptocurrency on behalf of the user for use in executing the transaction and may deduct funds for purchasing the cryptocurrency from an account associated with the user (e.g., a centrally managed wallet or account maintaining a balance of funds denominated in a fiat currency). These purchased cryptocurrency funds may be used for both the payment to the seller of the digital asset and may also be used for the payment of transaction fees (e.g., "gas" in the Ethereum blockchain). Some aspects of embodiments also relate to allowing the proxy cryptocurrency wallet to execute of transactions on behalf of the user cryptocurrency wallet, or prevent the execution of such transactions, in accordance with one or more permissions associated with the user cryptocurrency wallet.

FIG. 1 is a block diagram depicting interactions between a user and a proxy cryptocurrency wallet according to one embodiment of the present disclosure configured to assist in the process of purchasing a digital asset. As shown in FIG. 1, various components of embodiments of the present disclosure are implemented by a computer system including a processor and memory. For example, a cryptocurrency transaction proxy service 110 may be implemented using computer instructions stored in memory of a computer system, thereby configuring the computer system to be a special purpose computer system that implements methods described herein. The computer system may include one or more server computers located in one or more data centers. The computer instructions may be deployed as a software application directly on the one or more server computers and/or may be executed by virtual machines running on the one or more server computer systems using virtualization software (e.g., a hypervisor) and/or in isolated container environments. Various aspects of the techniques described herein may be implemented by one or more different computers (e.g., as a distributed system) communicating over a computer network, and multiple computers may implement the same functionality concurrently (e.g., to process different transactions concurrently).

As shown in FIG. 1, a user 120 controls a user cryptocurrency wallet 122 which, as previously noted, is associated with a user private key and a user public key. The user public key is publicly known and may be referred to as the wallet address of the user cryptocurrency wallet (e.g., user cryptocurrency wallet address). The private key is kept secret. The user 120 may desire to engage in a cryptocurrency transaction to purchase a digital asset (e.g., an NFT or a token as discussed above) where the purchase requires payment to a specified payee cryptocurrency wallet 130 using a specified cryptocurrency. In this example, the user cryptocurrency wallet 122 may have no funds or insufficient funds in the cryptocurrency required for the purchase of the digital asset.

As discussed above, without the benefit of embodiments of the present disclosure, a user 120 would typically need to perform a multi-step process. The user 120 may initially interact with a website that provided information regarding the requirements to purchase the desired digital asset (e.g., a price specified in a cryptocurrency and a payee cryptocurrency wallet). The user would then attempt to initiate a transaction to purchase the digital wallet by inputting the transaction details into their cryptocurrency wallet. However, the cryptocurrency wallet (e.g., the client software for generating transactions and managing the public and private keys) would typically generate an error if the cryptocurrency wallet had insufficient funds for that transaction. To address the lack of funds, a user may then purchase enough of the required cryptocurrency to perform the transaction, such as by interacting with a cryptocurrency exchange or liquidity provider 140 to purchase this cryptocurrency using fiat currency, where the purchased cryptocurrency is delivered to the user cryptocurrency wallet 122.

Depending on multiple factors, such as the transaction used to pay the cryptocurrency exchange (e.g., credit card, debit card, electronic check, automated clearing house (ACH) transactions, etc.) and the size of the transfer, the transfer may be completed instantly or may take days to complete. In addition, depending on the cryptocurrency being purchased, it may take several minutes to hours for the transaction to be added to the public ledger such that the purchased cryptocurrency funds are deposited in the user cryptocurrency wallet. Due to the uncertainty in the length of this delay, the user 120 may need to periodically check (e.g., poll) the cryptocurrency wallet to see if the funds have been deposited. Once those funds have been deposited (minutes to hours later), the user 120 can then reattempt the transaction to purchase the desired digital asset.

The present disclosure is directed to simplifying the process of purchasing a digital asset using a cryptocurrency transaction proxy service 110 that uses a proxy cryptocurrency wallet 124 acting as an intermediary for the transaction.

Instead of interacting directly with the payee cryptocurrency wallet 130, the user 120 may generate a pre-authorization of a transaction that identifies the digital asset to be purchased, the price to be paid, and the payee cryptocurrency wallet 130, and may also identify a recipient cryptocurrency wallet 126 (or destination cryptocurrency wallet) to receive the digital asset (e.g., this may be the user cryptocurrency wallet 122 in a case where the user is purchasing the asset for themselves or another cryptocurrency wallet in a case where the user is purchasing for the benefit of another cryptocurrency wallet, such as in the case of a gift or where the user maintains different cryptocurrency wallets for different purposes). The user 120 may then sign the pre-authorization of the transaction using the private key associated with their user cryptocurrency wallet 122 (e.g., so that the cryptocurrency transaction proxy service 110 can authenticate the pre-authorization of the transaction using the content of the transaction and the public key associated with the user cryptocurrency wallet 122).

In some embodiments, the cryptocurrency transaction proxy service 110 deploys a proxy cryptocurrency wallet 124 that is associated with the user 120 (e.g., where the proxy cryptocurrency wallet 124 will only process transactions pre-authorized by the user cryptocurrency wallet 122). For example, the cryptocurrency transaction proxy service 110 may deploy the user proxy cryptocurrency wallet by generating a new cryptocurrency wallet for the user, such as by generating a new public key pair. In other examples, a same proxy cryptocurrency wallet is persistent in that it persists between different transactions (e.g., can be reused for multiple transactions) and remains under the ownership and control of the user 120. In some examples, a new, ephemeral proxy cryptocurrency wallet is generated for each transaction initiated by the user and subsequently deleted once the transaction is complete (e.g., where the private key of the proxy cryptocurrency wallet is automatically deleted).

Figure 2:
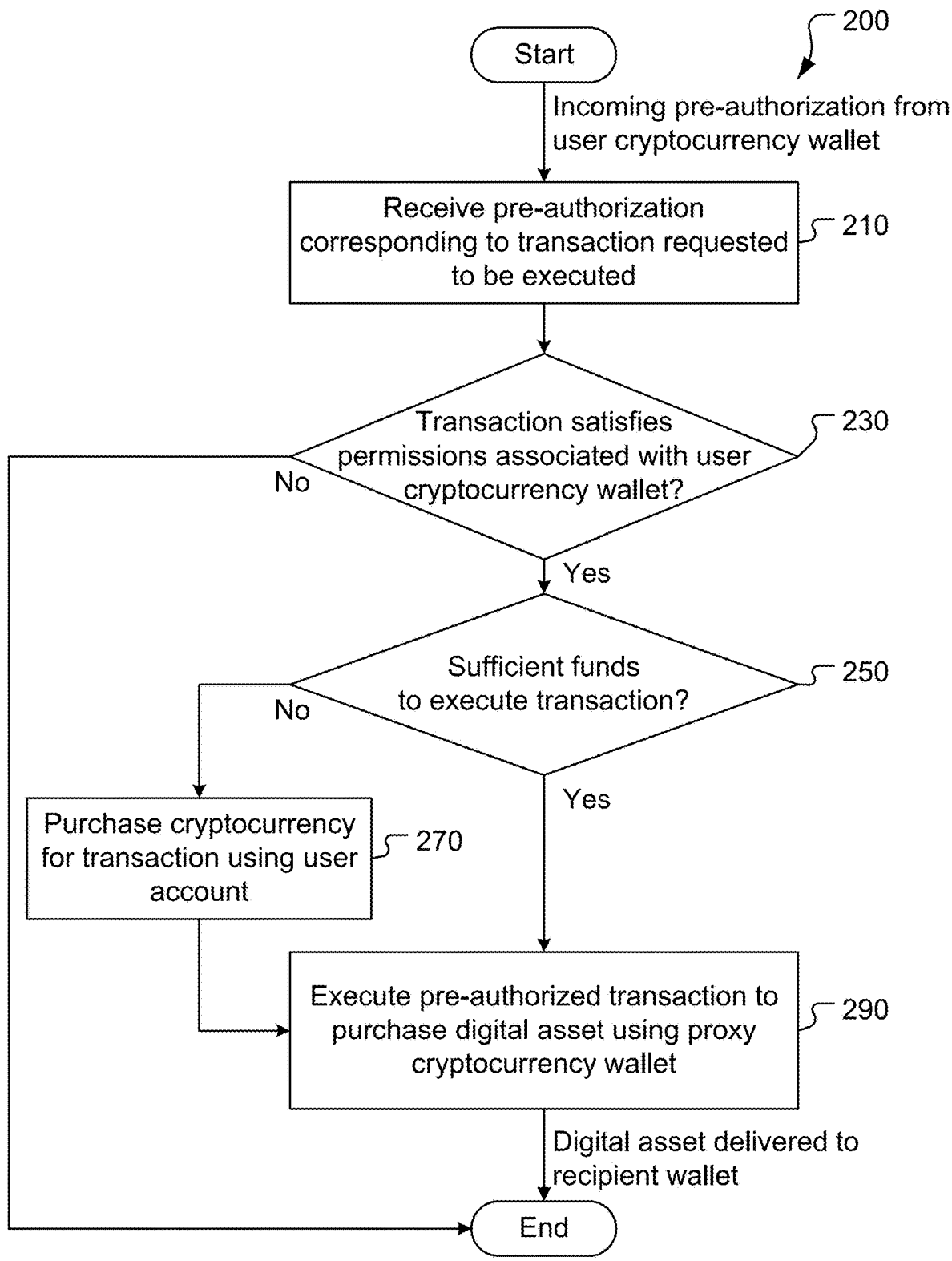
FIG. 2 is a flowchart depicting a method for initiating a cryptocurrency transaction to be processed by a proxy cryptocurrency wallet according to one embodiment of the present disclosure.

FIG. 2 is a flowchart depicting a method 200 for initiating a cryptocurrency transaction to be processed by a proxy cryptocurrency wallet according to one embodiment of the present disclosure. In some examples, the operations of FIG. 2 will be described as being performed by a proxy cryptocurrency wallet, which may be implemented as a computer program (e.g., program instructions stored in memory) executed by one or more processing circuits of a computer system (e.g., one or more servers). The computer program may be implemented as compiled object code, compiled bytecode, interpreted code, and the like running directly on the processor or in a virtual machine or may be implemented as a smart contract running on a corresponding virtual machine (e.g., written in the Solidity programming language and running on the Ethereum Virtual Machine), or combinations thereof. However, embodiments of the present disclosure are not limited thereto.

Referring to FIG. 2, at operation 210, the proxy cryptocurrency wallet 124 receives a pre-authorization of a transaction from a user cryptocurrency wallet 122. As noted above, the transaction may specify a digital asset to be purchased, a price (e.g., a purchase price denominated in a cryptocurrency such as Ether or Bitcoin), and a payee cryptocurrency wallet (e.g., the wallet address of the payee who will receive the payment). The transaction may also specify a recipient cryptocurrency wallet 126 or destination cryptocurrency wallet that will receive the purchased digital asset when the transaction is complete.

At operation 230, the proxy cryptocurrency wallet 124 determines whether the transaction satisfies one or more permissions associated with the user cryptocurrency wallet 122. When the transaction fails to satisfy the permissions, then the transaction is blocked from execution (e.g., the proxy cryptocurrency wallet 124 does not execute the transaction) and the process ends. When the permissions are satisfied, then the transaction is allowed to proceed, such as by proceeding to operation 250, as shown in FIG. 2. By requiring that the transaction satisfy these one or more permissions in order to be executed, the proxy cryptocurrency wallet 124 can reduce the risk that the user 120 will suffer an undesired loss through engaging in the transaction.

For example, when using other cryptocurrency wallets, a transaction can only be authorized or signed when the cryptocurrency wallet holds sufficient funds to complete the transaction. A user 120 engaging in a transaction using such a cryptocurrency wallet is exposed to potential loss only to the extent of the balance held in that cryptocurrency wallet.

However, in the case of a proxy cryptocurrency wallet that allows the pre-authorization of transactions even if the user cryptocurrency wallet lacks sufficient funds to execute the transaction, the potential financial exposure is much higher because the proxy cryptocurrency wallet can purchase additional cryptocurrency on behalf of the user (as described in more detail below), where this additional cryptocurrency can be paid for using, for example, fiat currency funds in other user accounts (e.g., a balance in the user account or in a connected bank account, or through a connected credit provider such as a credit card or line of credit).

Therefore, some aspects of embodiments of the present disclosure relate to requiring that the transaction satisfy one or more permissions, thereby allowing a user to specify various requirements, limits, and the like on transactions that can be executed by the proxy cryptocurrency wallet 124 on behalf of the user, thereby allowing for increased control over the risk exposure.

Figure 3:
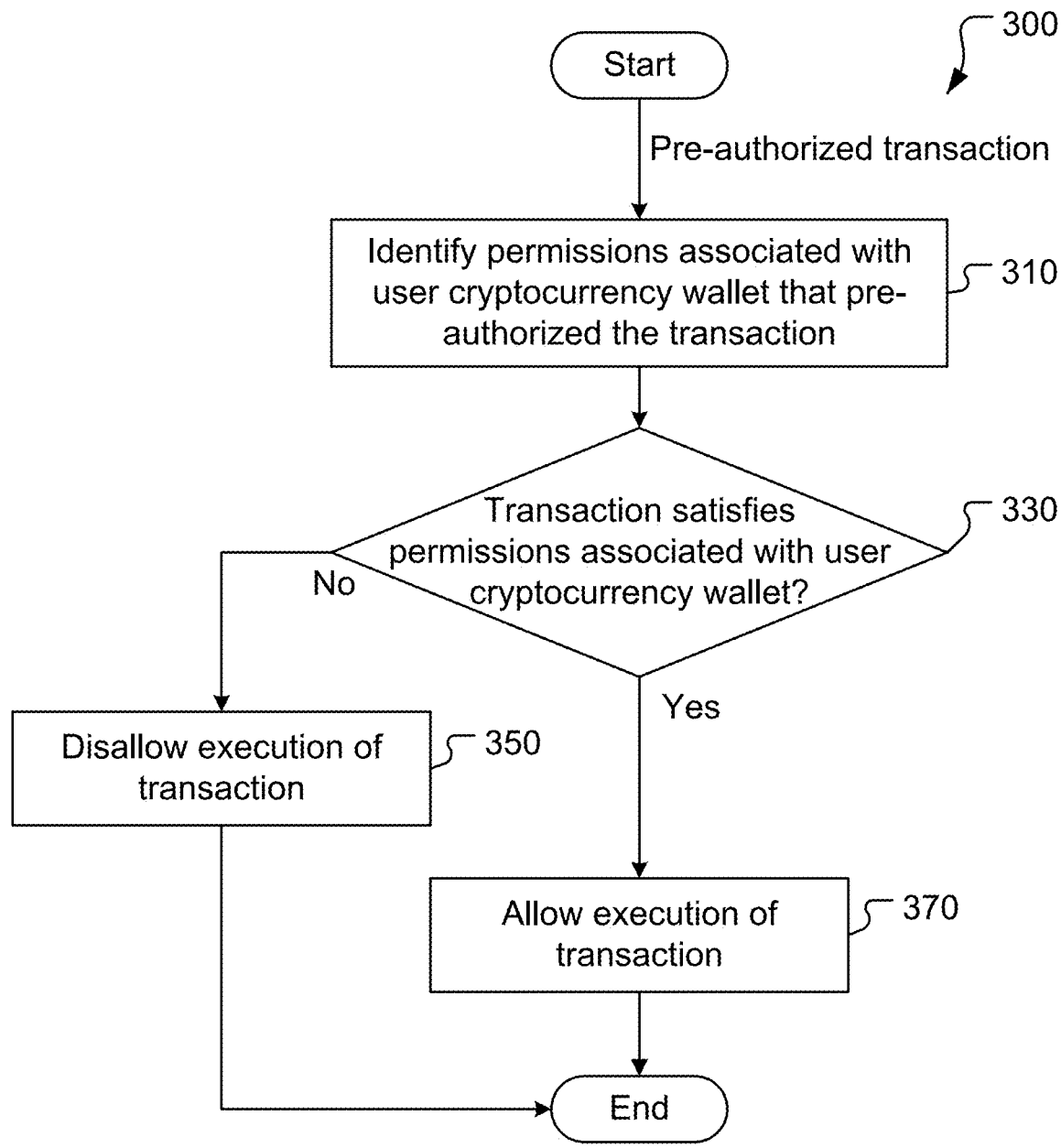
FIG. 3 is a flowchart depicting a method for evaluating a transaction against one or more permissions associated with a user cryptocurrency wallet according to one embodiment of the present disclosure.

FIG. 3 is a flowchart depicting a method 300 for evaluating a transaction against one or more permissions associated with a user cryptocurrency wallet according to one embodiment of the present disclosure. The method 300 shown in FIG. 3 is one example embodiment for determining whether a transaction satisfies permissions associated with a user cryptocurrency wallet as shown in operation 230 of FIG. 2.

At operation 310, the proxy cryptocurrency wallet 124 identifies permissions associated with the user cryptocurrency wallet 122 that pre-authorized the transaction. The permissions may be expressed as computer readable instructions and/or data, such as in the form of executable code (e.g., a JavaScript function, a function executable by the Ethereum Virtual Machine, and the like), in the form of a list of parameters in a data storage format (e.g., JavaScript Object Notation or JSON, Extensible Markup Language or XML, and the like). In some embodiments, the permissions are signed using the user cryptocurrency wallet 122, and the proxy cryptocurrency wallet 124 verifies the signature on the permissions and aborts the transaction if the signature verification fails.

In some examples, the permissions are stored by the user cryptocurrency wallet 122, where the proxy cryptocurrency wallet 124 retrieves the permissions from the user cryptocurrency wallet 122 through an application programming interface (API). In some examples, the permissions are transmitted from the user cryptocurrency wallet 122 along with the pre-authorization of the transaction. In some examples, the permissions are stored by the cryptocurrency transaction proxy service 110 in association with the user cryptocurrency wallet and therefore may be identified based on the wallet address of the user cryptocurrency wallet or based on other identifiers associated with a user account on the cryptocurrency transaction proxy service 110.

In various embodiments, the one or more permissions associated with a user cryptocurrency wallet 122 include, for example, transaction size limits (e.g., a maximum price of a transaction), restrictions on allowed or disallowed payee wallet addresses and/or destination wallet addresses, restrictions based on transaction risk scores as calculated based on, for example, the payee wallet addresses and/or destination wallet addresses, and the like.

At operation 330, the proxy cryptocurrency wallet 124 evaluates the transaction against the one or more permissions associated with the user cryptocurrency wallet to determine if the transaction satisfies those permissions. When there is only one permission, then the result of evaluating the single permission determines whether the transaction can proceed. When there is more than one permission, the permissions may be related using, for example, Boolean operators, such as by requiring all of the permissions to be satisfied (e.g., using AND operators), requiring at least one permission to be satisfied (e.g., using OR operators), or where different permissions may be grouped (e.g., with parentheses), and evaluated in various combinations using AND, OR, XOR, and NOT operators, and the like.

As one example of a permission, a maximum price permission may specify a maximum price threshold value, where transactions having a price at or below the maximum price threshold value satisfy the maximum price permission and transactions having a price exceeding the maximum price threshold value do not satisfy the maximum price permission. In some examples, the maximum price threshold value is denominated in a particular cryptocurrency (e.g., "transaction price is no more than 2.5 ETH") or may be denominated in a fiat currency (e.g., "transaction price is no more than 3,000 USD"), where a current exchange rate may be applied to compare the price in the transaction (e.g., denominated in a cryptocurrency) to the maximum price threshold value of the maximum price permission. In such cases, the calculation may include some margin to account for fluctuations in the exchange rate and to account for execution costs or transaction fees of the transaction (e.g., Ethereum gas fees). Techniques for estimating the total cost of executing a transaction will be described in more detail below.

Some aspects of embodiments relate to permissions that are based on the payee wallet address. For example, a permitted payee permission (or allowed payee permission) determines whether a payee cryptocurrency wallet identified in a transaction is a member of a collection (e.g., list or set) of cryptocurrency wallet addresses that are allowed to receive payments in transactions initiated by the user cryptocurrency wallet 122. This collection of payees may be, for example, a collection of known reputable payees, such as popular vendors and intermediaries for managing the sale of NFTs, popular DAOs, and the like. In such a case, the allowed payee permission is satisfied if the payee cryptocurrency wallet identified in the transaction by its payee cryptocurrency wallet address appears in the collection of allowed payees, and the allowed payee permission is not satisfied if the payee cryptocurrency wallet address is not present on the list. Enforcing an allowed payee permission also provides protection against man-in-the-middle attacks in which a third party causes a user to sign a transaction that identifies the attacker's cryptocurrency wallet address as the payee wallet address (e.g., such as by compromising a distributed application that offers the digital asset for sale).

Similarly, a blocked payee permission (or disallowed payee permission) may block or prevent transactions that would result in payment to any of a list of disallowed cryptocurrency wallet addresses. These may include wallet addresses that have been previously reported by users to be problematic (e.g., where, after the transaction was complete, the user discovered that the transaction was fraudulent, such as because the payee failed to deliver the expected digital asset) and/or wallet addresses that are legally disallowed (e.g., wallet addresses that are under government-imposed sanctions).

In some embodiments, this collection of permitted payees is generated based on historical information collected from prior cryptocurrency transactions, such as by retrieving information from a public distributed ledger. The cryptocurrency transaction proxy service 110 collects information provided by users regarding their experiences in engaging in these cryptocurrency transactions, such as whether the transaction proceeded as expected or whether the transaction turned out to be part of scheme to defraud the user of their cryptocurrency funds (such as where the transaction did not proceed as the user expected). Accordingly, the historical data regarding these wallet addresses and user reports regarding transactions that these wallet addresses participated in are used to compute corresponding reputation scores (or corresponding reputations) for these wallet addresses. Wallet addresses that are frequently or consistently are payees in transactions that are reported by users as good or operating as expected may be treated as being more reputable or trustworthy (e.g., given higher reputation scores), such that they may eventually be added to the collection of permitted payees (e.g., when a reputation score exceeds a threshold value). Wallet addresses that are frequently appear in transactions that are reported as being part of fraudulent activity may eventually be added to the list of blocked payees (e.g., when the reputation score falls below a threshold value).

In a parallel manner, a transaction may specify a destination cryptocurrency wallet or recipient cryptocurrency wallet 126 that is to receive the digital asset (e.g., an NFT, tokens, or another cryptocurrency) purchased through the transaction. A permitted recipient permission (or allowed recipient permission or allowed destination permission) may require that the recipient cryptocurrency wallet appear in a collection of allowed recipient wallet addresses (e.g., cryptocurrency wallets under the control of the user and/or the user's personal network), thereby reducing the possibility of a fraudulent transaction that makes use of a compromised user cryptocurrency wallet or a man-in-the-middle (MITM) attack to purchase digital assets for an unrelated third party. Similarly, a blocked recipient permission (or disallowed recipient permission) may specify a collection of wallet addresses that cannot be designed as the recipient of the digital asset in a transaction (e.g., wallet addresses that were used to receive digital assets in previously reported fraudulent transactions).

Figure 4:
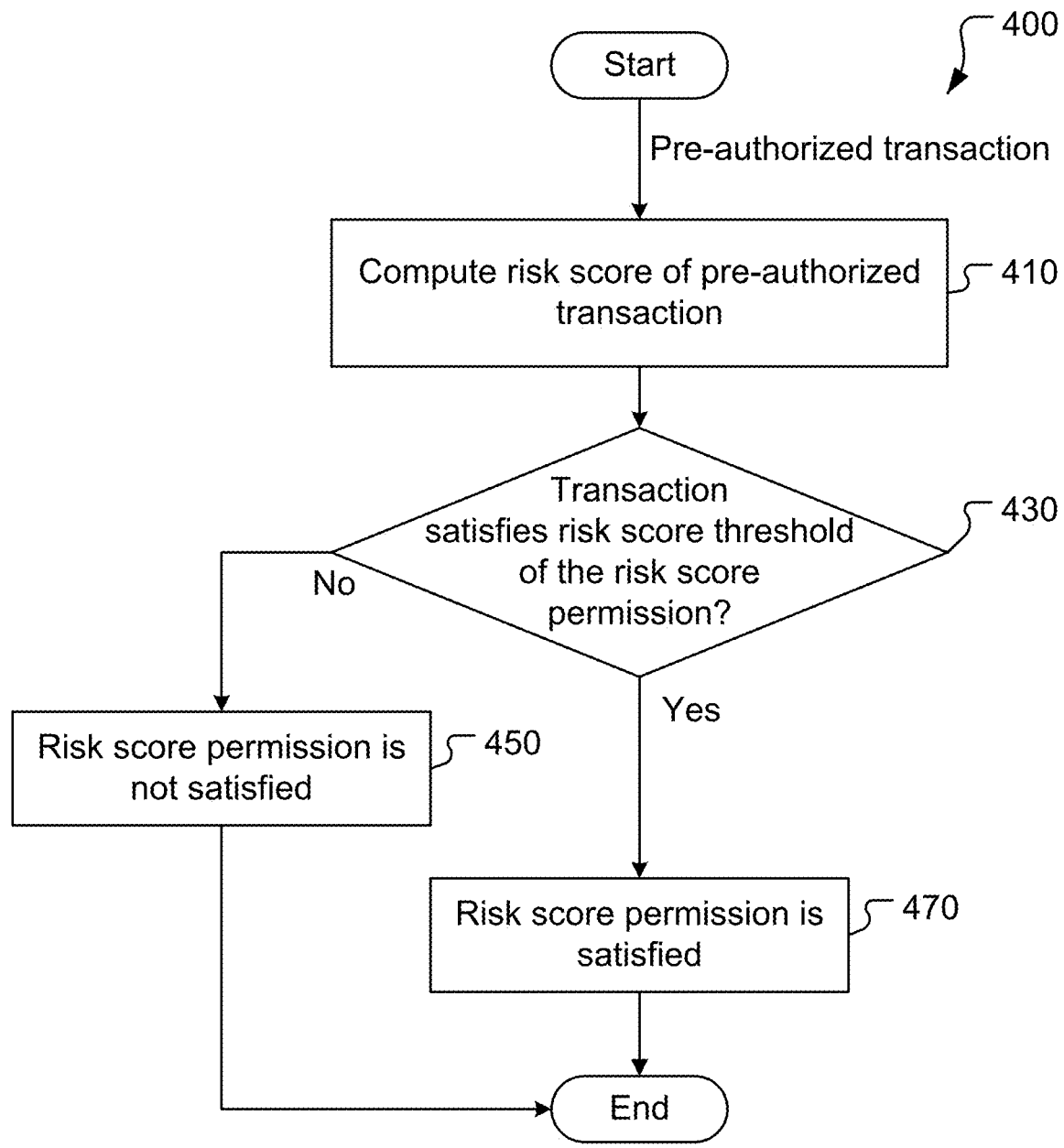
FIG. 4 is a flowchart depicting a method for evaluating a risk score permission among one or more permissions associated with a user cryptocurrency wallet according to one embodiment of the present disclosure.

Some aspects of embodiments of the present disclosure relate to permissions that are based on one or more risk scores. FIG. 4 is a flowchart depicting a method 400 for evaluating a risk score permission among one or more permissions associated with a user cryptocurrency wallet according to one embodiment of the present disclosure.

At operation 410, the proxy cryptocurrency wallet 124 computes a risk score of the pre-authorized transaction provided by the user cryptocurrency wallet 122. A risk score may represent an assessment of the risk associated with completing the transaction (e.g., risk that the transaction is fraudulent), where the risk score may include a numerical value. In some embodiments, a risk score is computed for a transaction based on one or more data fields associated with the transaction, such as the payee cryptocurrency wallet and the receiving (or destination) cryptocurrency wallet.

Some aspects of embodiments relate to computing a risk score for a transaction based on previous transactions associated with the payee cryptocurrency wallet identified in the transaction. For example, the risk score for a transaction that identifies a payee cryptocurrency wallet (e.g., cryptocurrency wallet address) associated with a reputable user may contribute to that transaction being identified as being safer (e.g., lower risk) than a transaction where the payee wallet address has little or no transaction history (e.g., because it is a newly created cryptocurrency wallet) or wallet addresses that appear to be associated with fraudulent activity.

In some embodiments, the cryptocurrency transaction proxy service 110 uses the reputation scores of cryptocurrency wallet addresses as determined based on prior transactions as a factor in computing the risk of a transaction (see, e.g., the discussion of computing a reputation for a payee cryptocurrency wallet based on user feedback on prior transactions involving the wallet address of that payee cryptocurrency wallet). For example, a transaction identifying a payee cryptocurrency wallet that has a poor reputation (e.g., frequent participation in transactions that were reported as being fraudulent) indicates that the transaction is more likely to be fraudulent (e.g., a risk score that is less likely to satisfy the risk score permission), whereas a payee cryptocurrency wallet that has a good reputation may indicates that the transaction is more likely to be safe (e.g., a risk score that is more likely to satisfy the risk score permission). In additional embodiments, the process of identifying the reputation of the payee cryptocurrency wallet may include analyzing previous transactions that the payee cryptocurrency wallet was involved in (by analyzing blockchain activity) and determine if the payee has transacted with cryptocurrency wallet addresses that are blacklisted or known to be associated with parties involved in fraud or nefarious activities.

At operation 430, the proxy cryptocurrency wallet 124 determines whether the transaction satisfies the risk score threshold associated with the risk score permission that is being evaluated. A risk score may be referred to as satisfying its corresponding risk score permission when a comparison between the risk score and a risk score threshold associated with the risk score permission indicates that the transaction is more likely to be safe. For example, a risk score may represent a probability that the transaction is fraudulent (e.g., where a high score indicates a high risk), in which case a risk score that was lower than the risk score threshold would satisfy that risk score permission. As another example, a risk score may represent a probability that the transaction is safe (e.g., where a high score indicates low risk), in which case a risk score that was higher than the risk score threshold would satisfy that risk score permission.

In some embodiments, the reputation score for a wallet address includes a parameter reflecting the volume of transactions or number of transactions that the wallet address has participated in. For example, payee wallet addresses that are involved in fewer previous transactions may exhibit higher variance in their reputation scores than payee wallet addresses that are involved in many previous transactions. Accordingly, some aspects of embodiments relate to evaluating whether a transaction satisfies the risk score permission based on the reputation score of a payee cryptocurrency wallet and the number of transactions that the payee cryptocurrency wallet has participated in (e.g., relaxing the conditions to satisfy the risk score permission when the number of transactions is small, but greater than zero, and/or making the conditions to satisfy the risk score permission more stringent when the payee wallet address has no history of previous transactions).

In some embodiments, the risk score permission may further determine whether the transaction satisfies the risk score permission based on the price identified in the transaction. For example, a riskier transaction may be allowed to proceed when the price in the transaction is low, whereas a transaction specifying a higher price may involve more a stringent application of the risk score permission (e.g., require a better reputation score of the payee cryptocurrency wallet). As one example, a transaction having a price below a threshold risk price may be subject a first risk score threshold, whereas a transaction having a price at or above the threshold risk price may be subject to a second risk score threshold that is more stringent that the first risk score threshold. As another example, the risk score threshold may be computed as a function of the price specified in the transaction, such as being computed based on a logistic function.

Some aspects of embodiments relate to permissions that allow different conditions (e.g., relaxed conditions) to be applied based on pre-authorizations from both the user cryptocurrency wallet and a designated second user cryptocurrency wallet. For example, the designated second user cryptocurrency wallet may be controlled by the user 120 or another user (e.g., a trusted party), thereby allowing engagement in riskier activities with authorization from the second user cryptocurrency wallet.

For example, a maximum price permission associated with a cryptocurrency wallet may set a maximum price of 1 ETH. Submitting a pre-authorized transaction having a price of 1.7 ETH would therefore fail this maximum price permission. However, in some embodiments, the maximum price permission may also accept a second signature or pre-authorization from a designated second user cryptocurrency wallet, where having the additional signature from that second user cryptocurrency wallet increases the maximum price threshold value to 5 ETH.

As another example, a risk score threshold may be set at 0.20, such that a transaction that scored at 0.27 would not be permitted to proceed. However, a pre-authorization from a second user cryptocurrency wallet may allow the risk score threshold to be relaxed to 0.3, thereby allowing the risk score permission to be satisfied.

In a case where the transaction fails to satisfy the risk score threshold of the risk score permission, then, at operation 450 the risk score permission is determined as not being satisfied and the satisfaction failure result is reported back to the evaluation of the permission (e.g., as performed at operation 330 of the method shown in FIG. 3). In a case where the transaction does satisfy the risk score threshold of the risk score permission, then, at operation 470 the risk score permission is determined as being satisfied and the satisfaction success result is reported back to the evaluation of the permission (e.g., as performed at operation 330 of the method shown in FIG. 3).

While the permissions are described herein as being associated with the user cryptocurrency wallet 122, embodiments are not limited thereto. For example, in some embodiments, the cryptocurrency transaction proxy service 110 allows different proxy cryptocurrency wallets to have different sets of permissions, and a user cryptocurrency wallet may pre-authorize transactions that use different ones of the proxy cryptocurrency wallets in accordance with different transaction profiles. For example, one proxy cryptocurrency wallet may be designated for use in low-risk transactions and therefore may have more restrictive permissions, whereas another proxy cryptocurrency wallet may be designed for use in higher-risk transactions and may have less restrictive permissions.

In addition, while the permissions implemented or enforced by a proxy cryptocurrency wallet 124 are described above as being associated with the user cryptocurrency wallet 122 that pre-authorized the transaction, some aspects of embodiment of the present disclosure relate to directed acyclic graphs of one or more user cryptocurrency wallets and one or more proxy cryptocurrency wallets.

For example, in some circumstances, a user cryptocurrency wallet may sign a transaction to generate a pre-authorized transaction that is submitted to a first proxy cryptocurrency wallet, which may then add additional permissions to the collection of permissions set by the user cryptocurrency wallet, then forward the pre-authorized transaction, with the updated collection of permissions, to a second proxy cryptocurrency wallet for execution, where the second proxy cryptocurrency wallet enforces the permissions set by both the user cryptocurrency wallet and the first proxy cryptocurrency wallet (e.g., where the permissions of both wallets must be satisfied for the transaction to proceed).

As another example, in some circumstances, a first user cryptocurrency wallet and a second cryptocurrency wallet may both sign a transaction, where the pre-authorized transaction is forwarded to a proxy cryptocurrency wallet, where the proxy cryptocurrency wallet applies both a first collection of permissions associated with the first user cryptocurrency wallet and a second collection of permissions associated with the second user cryptocurrency wallet (e.g., where the permissions of both wallets must be satisfied for the transaction to proceed).

These two relationships may be composed in various ways to form directed acyclic graphs of connected user cryptocurrency wallets and proxy cryptocurrency wallets, and where the permissions set by each cryptocurrency wallet are added to the collection of permissions to be enforced on the transaction.

Referring again to FIG. 3, at operation 330, the proxy cryptocurrency wallet 124 evaluates the one or more permissions to determine whether the transaction satisfies the one or more permissions associated with the user cryptocurrency wallet. In a case where the one or more permissions are not satisfied, then, at operation 350 the transaction is blocked from execution. In a case where the transaction does satisfy the one or more permissions, then, at operation 370, the transaction is allowed to be executed.

Referring again to FIG. 2, in a case where, at operation 230, the transaction fails to satisfy the one or more permissions associated with the user cryptocurrency wallet 122, then the proxy cryptocurrency wallet 124 may end the process of initiating the transaction. This may include, for example, returning an error message to the user cryptocurrency wallet 122, where the error message may identify why the transaction failed to satisfy the permissions (e.g., because the risk score for the transaction failed to satisfy the risk score threshold of a risk score permission).

In a case where, at operation 230, the proxy cryptocurrency wallet 124 determines that the transaction does satisfy the one or more permissions associated with the user cryptocurrency wallet 122, then the proxy cryptocurrency wallet 124 proceeds, at operation 250, to determine whether there are sufficient cryptocurrency funds to execute the transaction.

Other user cryptocurrency wallets do not allow the signing or authorization of transactions when the wallet does not hold sufficient funds to execute the transaction. However, in some embodiments of the present disclosure, the transaction can be pre-authorized by a user cryptocurrency wallet 122 that lacks sufficient funds to execute the transaction.

In the case of a proxy cryptocurrency wallet 124 that persists between transactions, the proxy cryptocurrency wallet 124 may be associated with a balance of cryptocurrency funds. If the proxy cryptocurrency wallet 124 contains sufficient funds to execute the transaction, then the proxy cryptocurrency wallet 124 may determine at operation 250 that there are sufficient funds to proceed (even if the user cryptocurrency wallet does not hold sufficient funds for the transaction).

In some embodiments, when the proxy cryptocurrency wallet 124 does not hold sufficient funds to execute the transaction, but the combination of the cryptocurrency funds held in the user cryptocurrency wallet 122 with the funds held in the proxy cryptocurrency wallet 124 would be sufficient, then the proxy cryptocurrency wallet 124 may determine that there are sufficient funds to execute the transaction.

In some embodiments, the user 120 may have a user account associated with the cryptocurrency transaction proxy service 110 and/or be associated with a temporary account on the cryptocurrency transaction proxy service 110. This user account may, in turn, be associated with (e.g., have ownership and control over) one or more balances of funds in one or more different currencies, including fiat currencies (such as United States Dollars, Euros, Japanese Yen, and the like) and cryptocurrencies (such as Bitcoin, Ether, and the like). The user account may also be associated with one or more external funding sources, such as traditional bank accounts (e.g., checking or savings accounts)

with associated fiat currency balances and such as credit accounts (e.g., credit cards and lines of credit).

According to some embodiments of the present disclosure, when there are insufficient funds to execute the transaction, the proxy cryptocurrency wallet 124 automatically purchases, at operation 270, cryptocurrency for the transaction using funds associated with the user account, such as using funds denominated in a fiat currency or funds denominated in a different cryptocurrency than that used for the transaction (e.g., the payee of the transaction may require payment in Ether, and the user account may use funds in United States Dollars or Bitcoin to purchase funds in Ether to complete the transaction).

In some cryptocurrency platforms, executing a cryptocurrency transaction also requires the payment of transaction fees, in addition to the price paid to the payee cryptocurrency wallet, where these transaction fees may be paid to third parties to compensate those third parties for the cost of validating the transaction. (For example, the Ethereum platform refers to these transaction fees as gas, which is paid in Ether.)

In many cases, it can be difficult for a user to predict how much a transaction will cost in transaction fees. Furthermore, a transaction with an exchange to purchase cryptocurrency may also incur transaction fees. Purchasing cryptocurrency for the transaction may be further complicated when the cryptocurrency required by the transaction cannot be purchased directly using fiat currency (e.g., where cryptocurrency exchanges will only accept payment for the desired cryptocurrency using other cryptocurrency). In such circumstances, it may be necessary to purchase an intermediate cryptocurrency using fiat currency (e.g., purchase USD Coin using United States Dollar fiat currency) and then purchase the desired cryptocurrency using the intermediate cryptocurrency. These additional transactions may also result in transaction fees that add to the total cost. Furthermore, fluctuations in the exchange rates of these cryptocurrencies can add uncertainty as to how much cryptocurrency will be bought in exchange for a particular amount of fiat currency (where this difference may be referred to as slippage).

As such, some aspects of embodiments of the present disclosure relate to estimating the amount of fiat currency that would be needed to purchase the necessary cryptocurrency funds to execute the pre-authorized transaction. Factors in this calculation may include, for example: the balances of other cryptocurrency funds in the user cryptocurrency wallet and/or in the proxy cryptocurrency wallet; the balance of fiat currency available in the user account; the current exchange rate between fiat currency and the desired cryptocurrency (and volatility thereof over time); the exchange rates of any exchanges for intermediate cryptocurrencies, if needed; the current transaction fees for executing a transaction (e.g., current price of gas on the Ethereum network) and the volatility of those transaction fees; and the like.

According to some embodiments of the present disclosure, the proxy cryptocurrency wallet 124 estimates the amount of fiat currency needed by simulating the execution of the pre-authorized transaction and any necessary precursor transactions, such as the purchase of intermediate cryptocurrencies. This simulation may further include the estimated transaction fees to execute the transaction, as appropriate for the cryptocurrency platforms executing those transactions.

Figure 5:
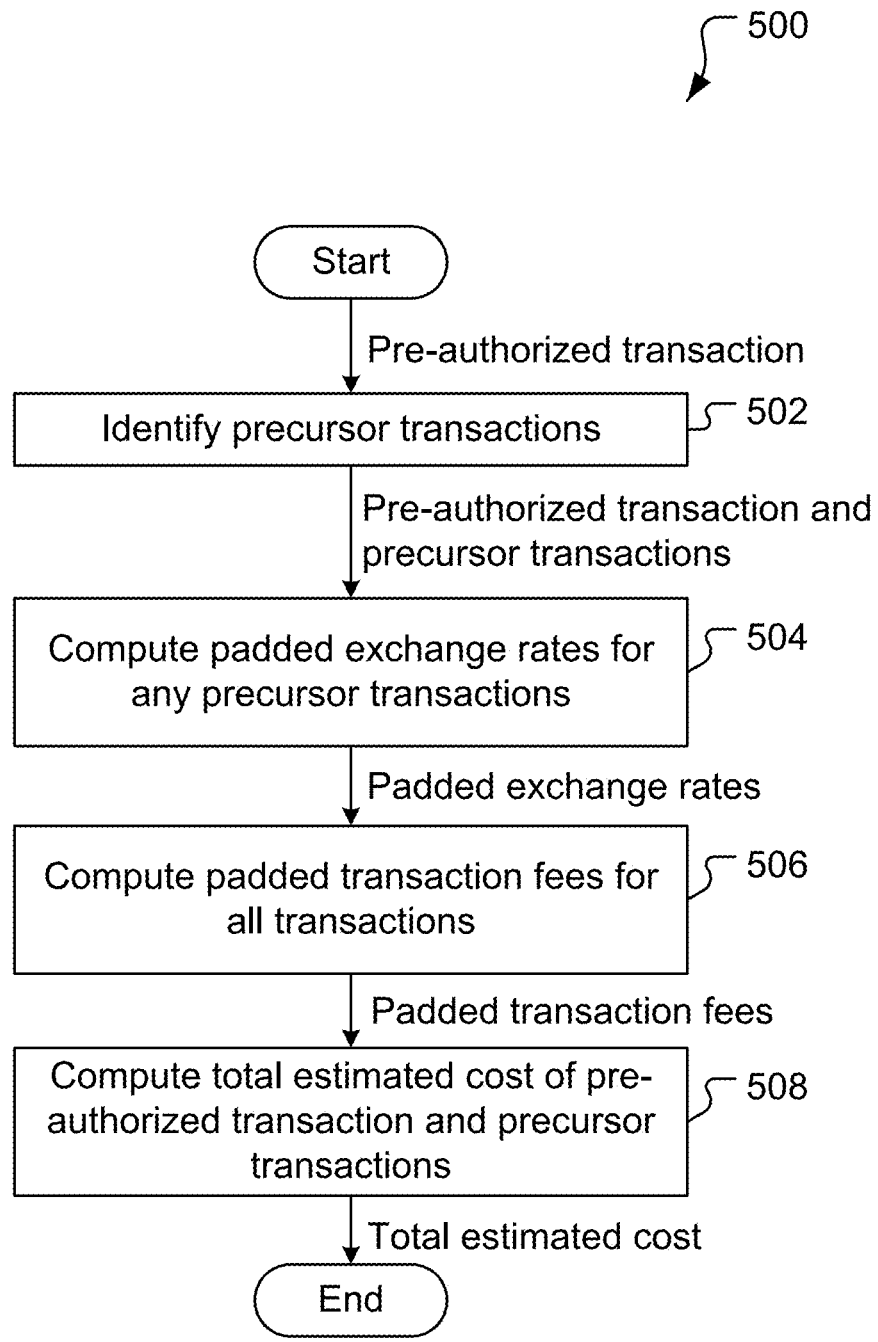
FIG. 5 is a flowchart depicting a method for estimating a total cost of executing a pre-authorized transaction according to one embodiment of the present disclosure.

FIG. 5 is a flowchart depicting a method for estimating a total cost of executing a pre-authorized transaction according to one embodiment of the present disclosure.

At operation 502, the proxy cryptocurrency wallet 124 identifies any precursor transactions that need to be executed prior to pre-authorized transaction. For example, in the case where there are insufficient funds to execute the transaction, a precursor transaction may include purchasing cryptocurrency from an exchange using fiat currency. In circumstances where the pre-authorized transaction requires a cryptocurrency that cannot be purchased using fiat currency, another precursor transaction may be the purchase of the required cryptocurrency using one or more intermediate cryptocurrencies. In some circumstances, cryptocurrency funds split between the user cryptocurrency wallet 122 and the proxy cryptocurrency wallet 124 are consolidated through an additional transaction (e.g., transferring funds from the user cryptocurrency wallet to the proxy cryptocurrency wallet) prior to executing the pre-authorized transaction.

At operation 504, the proxy cryptocurrency wallet 124 computes a padded exchange rate for each transaction. For example, the proxy cryptocurrency wallet 124 may obtain recent cryptocurrency exchange transactions published to a distributed ledger or as obtained from one or more cryptocurrency exchanges to identify recent exchange rates between a fiat currency and a cryptocurrency and/or different cryptocurrencies. The simulation of the execution of the transaction or transactions may further account for volatility by adding a padding or buffer to increase the likelihood that the calculated amount will be sufficient, such as by assuming a cryptocurrency exchange rate that is 95% or 99% likely (or higher) to be higher than the actual cryptocurrency exchange rate at the time that the transaction is executed, based on the volatility or variance of the exchange rates (e.g., based on statistical analysis of recent transactions occurring over a time window). In some embodiments, the threshold for these overestimates or conservative estimates in exchange rates may be set by the user based on how acceptable it would be for the transaction to sometimes fail due to unpredictability of these exchange rates.

At operation 506, the proxy cryptocurrency wallet 124 computes a padded transaction fee for each transaction. In some cases where there is no transaction fee associated with a transaction, that transaction fee is calculated as being zero. In a manner similar to that described above, the proxy cryptocurrency wallet 124 may obtain recent cryptocurrency transactions published to a distributed ledger or as obtained from one or more cryptocurrency exchanges to identify recent transaction fees charged for various cryptocurrency transactions, and use the collected information to compute a padded transaction fee representing a conservative estimate of the transaction fees that will be incurred in order to execute the pre-authorized transaction. For example, the transaction fees may be estimated based on assuming transaction fees that are 95% or 99% likely (or higher) to be higher than the actual transaction fees at the time that the transaction is executed, based on the volatility or variance of the transaction fees. In some embodiments, the threshold for these overestimates in transaction fees may be set by the user based on how acceptable it would be for the transaction to sometimes fail due to unpredictability of these transaction fees.

At operation 508, the proxy cryptocurrency wallet 124 computes an estimated total cost to execute the pre-authorized transaction and any precursor transactions. This estimated cost may be computed based on the padded exchange rates and padded transaction fees that were computed above.

For example, a particular banking may require the purchase of 35,000 digital tokens for that Dapp to become a member, but there is no way to purchase those bank tokens directly using fiat currency and must instead by purchased using Ether (ETH). If the user cryptocurrency wallet and/or the proxy cryptocurrency wallet do not hold any Ether, then it would also be necessary to purchase Ether from a cryptocurrency exchange. This cryptocurrency exchange similarly may not accept fiat currency, such that the user may need to purchase another cryptocurrency, such as USD Coin (USDC), using fiat currency.

Accordingly, the pre-authorized transaction would be the purchase of the 35,000 digital tokens (the price) using Ether. Precursor transactions identified in this would include a first exchange transaction to purchase ETH using USDC and a second exchange transaction to purchase USDC using fiat currency.

Conversions between ETH and the bank token may be subject to slippage due to fluctuations in the exchange rate between ETH and the bank token. Similarly, high variance in the exchange rate between ETH and USD may result in high slippage (e.g., difference between submitted price and actual price paid). The variance in the exchange rate may differ based on the nature of the transaction—for example, the second exchange transaction may exhibit less variance in exchange rate because USDC is a stablecoin that has a price that is pegged to the United States Dollar (USD).

In addition, the transaction to purchase the desired 35,000 bank tokens may also incur a transaction fee (e.g., Ethereum gas), that may fluctuate over time. Hence, this additional gas fee is padded to a value that is likely to be sufficient to cover the transaction fee at the time of execution. Similarly, the first exchange transaction and the second exchange transaction may also be subject to transaction fees, where these fees may vary over time, and may similarly be padded to values that cover these fees.

In some embodiments, to simulate the total cost of this transaction, the price desired to be paid for the digital tokens (35,000 bank tokens) is converted to Ether based on the padded exchange rate between Ether and the digital tokens plus the transaction fee for that pre-authorized transaction. This value, denominated in Ether, is then the amount of Ether that would need to be purchased using USDC. The padded exchange rate between USDC and Ether is then used to calculate the amount of USDC needed for the transaction, plus the transaction fee for the exchange (e.g., paid as part of the USDC paid to process the transaction), resulting in another price denominated in USDC. This price in USDC is then converted to a value in fiat currency (e.g., USD), plus the transaction fee for the purchase of USDC, to arrive at an estimated cost (in USD) of executing the pre-authorized transaction.

In some embodiments, the proxy cryptocurrency wallet 124 or the cryptocurrency transaction proxy service 110 may pay the transaction fees separately on behalf of user (e.g., using funds from a cryptocurrency wallet associated with the cryptocurrency transaction proxy service 110) and charge the user account for those transaction fees based on an exchange rate between that cryptocurrency and a fiat currency. In such embodiments, the transaction fees may be excluded from the simulation of the estimated cost of executing the transaction.

After computing the estimated cost for executing the transaction, the proxy cryptocurrency wallet 124 automatically purchases the estimated amount of cryptocurrency (or multiple different cryptocurrencies, as appropriate for the transaction) using user funds associated with the user account. The required cryptocurrency may be deposited in the proxy cryptocurrency wallet 124 or in the user cryptocurrency wallet 122.

At operation 290, when there are sufficient cryptocurrency funds to execute the pre-authorized transaction, the proxy cryptocurrency wallet 124 automatically executes the pre-authorized transaction to purchase the digital asset, where the digital asset is delivered to the recipient cryptocurrency wallet 126 identified in the pre-authorized transaction (e.g., delivery by virtue of the broadcast of the transaction identifying the recipient cryptocurrency wallet 126 as being the owner of the digital asset).

As noted above, the amount of time between initiating the purchase of cryptocurrency funds and receiving a deposit of those cryptocurrency funds can vary greatly. In some cases, multiple hours may elapse before the funds are deposited to a cryptocurrency wallet controlled by the user (e.g., the user cryptocurrency wallet 122 or the proxy cryptocurrency wallet 124). Therefore, the pre-authorized transaction may be asynchronously paused or suspended until the cryptocurrency funds are deposited, at which point the proxy cryptocurrency wallet 124 can automatically execute the suspended pre-authorized transaction. The pausing or suspending of the pre-authorized transaction is referred to as being asynchronous in that the proxy cryptocurrency wallet 124 and/or the cryptocurrency transaction proxy service 110 need not perform a blocking wait, but instead can perform other work, such as processing other cryptocurrency transactions. In some embodiments, the suspended pre-authorized transaction may be represented as a suspended callback that is executed upon receiving a notification that the funds have been deposited in the cryptocurrency wallet controlled by the user.

In some embodiments of the present disclosure, the proxy cryptocurrency wallet 124 is configured to further receive an authorization message from the user 120. In some embodiments, this authorization message is used to override one or more permissions that are not satisfied to approve the pre-authorized transaction to be executed. In some embodiments, the proxy cryptocurrency wallet 124 requests an approval of the transaction from the user as an additional requirement before executing the transaction (e.g., as an additional requirement before operation 290 as shown in FIG. 2).

Examples of techniques for generating an authorization message according to embodiments of the present disclosure include, but are not limited to: signing an authorization request or permission failure message from the proxy cryptocurrency wallet using the user cryptocurrency wallet; signing an authorization message using the user cryptocurrency wallet; clicking on a link in an email message or text message; entering a time-based one-time password code from an authenticator; responding to a notification while logged in with the user account associated with the proxy cryptocurrency wallet; responding to a notification in a client application (e.g., a software client managing the user cryptocurrency wallet); and the like.

As discussed above, the amount of cryptocurrency purchased for a transaction may include a buffer or padding to ensure that the amount of cryptocurrency that is ultimately purchased is likely to be sufficient to execute the transaction, based on variability in exchange rates and transaction fees. In many such cases, excess cryptocurrency funds will be purchased. In some embodiments where the proxy cryptocurrency wallet 124 persists between transactions, these excess funds may be retained in the proxy cryptocurrency wallet 124 for use by the user 120 in future transactions. In some embodiments, whether the proxy cryptocurrency wallet 124 is persistent or the proxy cryptocurrency wallet 124 is ephemeral, excess cryptocurrency funds are automatically returned to the user cryptocurrency wallet 122, as shown in FIG.

Some aspects of embodiments of the present disclosure relate to a user interface for a user to pre-authorize a transaction, where the user interface presents the transaction in a human readable format. In many cases, cryptocurrency-based transactions may be difficult for end-users to read. Furthermore, a user may attempt to initiate such a transaction by interacting with a web page associated with a distributed application (Dapp), such as by clicking on a button to initiate the purchase of a digital asset offered by the Dapp, where the Dapp then presents a transaction for the user to sign using their user cryptocurrency wallet. However, a compromised Dapp or malicious Dapp could ask the user to sign an arbitrary payload that set a higher price indicated on the web page or that changed the destination wallet. Accordingly, some aspects of embodiments of the present disclosure relate to a user interface that display the details of the transaction, such as the price, the payee wallet address, the recipient wallet address, and the digital asset to be purchased, in a human readable format such that the user 120 can verify that the content of the transaction to be signed matches their expectations.

In some embodiments where the proxy cryptocurrency wallet 124 is a persistent proxy cryptocurrency wallet associated with a user account, the cryptocurrency transaction proxy service 110 may control access to the proxy cryptocurrency wallet 124 based on the user cryptocurrency wallet 122, such as where the proxy cryptocurrency wallet 124 will only execute transactions that are pre-authorized by the user cryptocurrency wallet 122 and not execute transactions that are signed by other cryptocurrency wallets. However, in some circumstances, a user 120 may lose access to their user cryptocurrency wallet 122 (e.g., due to losing the passphrase or key for unlocking the private key associated with the user cryptocurrency wallet 122). Under such circumstances, the user may therefore lose access to any cryptocurrency funds that are held in the proxy cryptocurrency wallet 124.

Some aspects of embodiments of the present disclosure relate to methods for the cryptocurrency transaction proxy service 110 to allow the transfer of a proxy cryptocurrency wallet transfer between different user cryptocurrency wallets associated with a same user account. For example, the user 120 may have a second user cryptocurrency wallet registered with their user account on the cryptocurrency transaction proxy service 110 and can initiate a process that modifies the configuration of the proxy cryptocurrency wallet 124 to accept pre-authorized transactions that are signed by the second user cryptocurrency wallet. Once the proxy cryptocurrency wallet 124 is reconfigured in such a way, the user 120 can proceed with pre-authorizing new transactions using the second user cryptocurrency wallet.

To protect against circumstances where the user account on the cryptocurrency transaction proxy service 110 is compromised and where an attacker may attempt to register their own cryptocurrency wallet with the user account and transfer control of the proxy cryptocurrency wallet 124 from the user cryptocurrency wallet 122 to the attacker cryptocurrency wallet, in some embodiments the cryptocurrency transaction proxy service 110 notifies the user 120 (e.g., via email or other notification service) regarding the requested transfer of control, and the user 120 can deny the transfer of the proxy cryptocurrency wallet 124 by signing a transfer denial message using the user cryptocurrency wallet 122.

Accordingly, various aspects of embodiments of the present disclosure relate to systems and methods for initiating transactions on a blockchain, such as to purchase digital assets, through the use of a proxy cryptocurrency wallet. Some aspects of embodiments relate to pre-authorizing transactions using a user cryptocurrency wallet that may not have sufficient funds (e.g., cryptocurrency funds) to complete the transaction, where a proxy cryptocurrency wallet automatically uses the pre-authorization to purchase funds, as needed, and executes the transaction on behalf of the user cryptocurrency wallet. Some further aspects relate to automatically estimating the cost of executing the pre-authorized transaction by simulating the execution of the transaction. Some aspects of embodiments relate to one or more permissions associated with the user cryptocurrency wallet, such that the proxy cryptocurrency wallet executes the transaction only all permissions are satisfied. Some aspects further relate to combining permissions associated with multiple different cryptocurrency wallets that are related to signing or executing the pre-authorized transaction.

Figure 6:
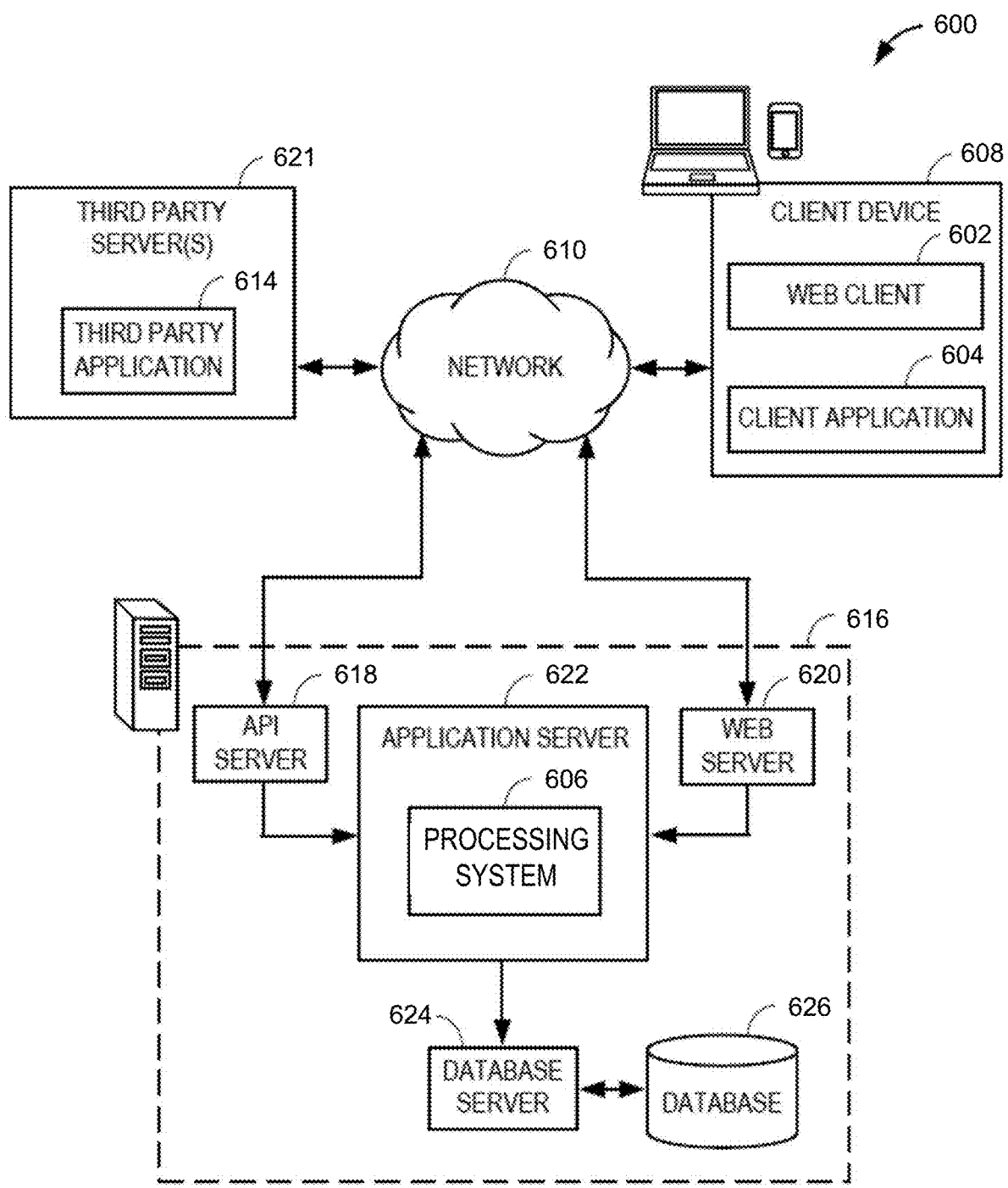
FIG. 6 is a block diagram illustrating a high-level network architecture of a computing system environment for operating a processing system according to embodiments of the present disclosure.

With reference to FIG. 6, an example embodiment of a high-level SaaS network architecture 600 is shown. A networked system 616 provides server-side functionality via a network 610 (e.g., the Internet or a WAN) to a client device 608. A web client 602 and a programmatic client, in the example form of a client application 604 (e.g., client software supporting user cryptocurrency wallets), are hosted and execute on the client device 608. The networked system 616 includes one or more servers 622 (e.g., servers hosting services exposing remote procedure call APIs), which hosts a processing system 606 (such as the processing system described above according to various embodiments of the present disclosure supporting a cryptocurrency transaction proxy service) that provides a number of functions and services via a service oriented architecture (SOA) and that exposes services to the client application 604 that accesses the networked system 616 where the services may correspond to particular workflows. The client application 604 also provides a number of interfaces described herein, which can present an output in accordance with the methods described herein to a user of the client device 608.

The client device 608 enables a user to access and interact with the networked system 616 and, ultimately, the processing system 606. For instance, the user provides input (e.g., touch screen input or alphanumeric input) to the client device 608, and the input is communicated to the networked system 616 via the network 610. In this instance, the networked system 616, in response to receiving the input from the user, communicates information back to the client device 608 via the network 610 to be presented to the user.

An API server 618 and a web server 620 are coupled, and provide programmatic and web interfaces respectively, to the servers 622. For example, the API server 618 and the web server 620 may produce messages (e.g., RPC calls) in response to inputs received via the network, where the messages are supplied as input messages to workflows orchestrated by the processing system 606. The API server 618 and the web server 620 may also receive return values (return messages) from the processing system 606 and return results to calling parties (e.g., web clients 602 and client applications 604 running on client devices 608 and third-party applications 614) via the network 610. The servers 622 host the processing system 606, which includes components or applications in accordance with embodiments of the present disclosure as described above. The servers 622 are, in turn, shown to be coupled to one or more database servers 624 that facilitate access to information storage repositories (e.g., databases 626). In an example embodiment, the databases 626 includes storage devices that store information accessed and generated by the processing system 606, such as the persistent store 280 of FIG. 2 and the persistent store 680 of FIG. 6 and other databases such as databases storing permissions associated with user cryptocurrency wallets and/or proxy cryptocurrency wallets, user account information, user account balances, and the like.

Additionally, a third-party application 614, executing on one or more third-party servers 621, is shown as having programmatic access to the networked system 616 via the programmatic interface provided by the API server 618. For example, the third-party application 614, using information retrieved from the networked system 616, may support one or more features or functions on a website hosted by a third party. For example, the third-party application 614 may serve as a data source for retrieving, for example, transaction information and/or price information regarding transaction fees and exchange rates and may also be accessed by the processing system 606 (e.g., by a proxy cryptocurrency wallet).

Turning now specifically to the applications hosted by the client device 608, the web client 602 may access the various systems (e.g., the processing system 606) via the web interface supported by the web server 620. Similarly, the client application 604 (e.g., an "app" such as a payment processor app) may access the various services and functions provided by the processing system 606 via the programmatic interface provided by the API server 618. The client application 604 may be, for example, an "app" executing on the client device 608, such as an iOS or Android OS application to enable a user to access and input data on the networked system 616 in an offline manner and to perform batch-mode communications between the client application 604 and the networked system 616.

Further, while the network architecture 600 shown in FIG. 6 employs a client-server architecture, the present disclosure is not limited to such an architecture, and could equally well find application in a distributed, or peer-to-peer, architecture system, for example.

Figure 7:
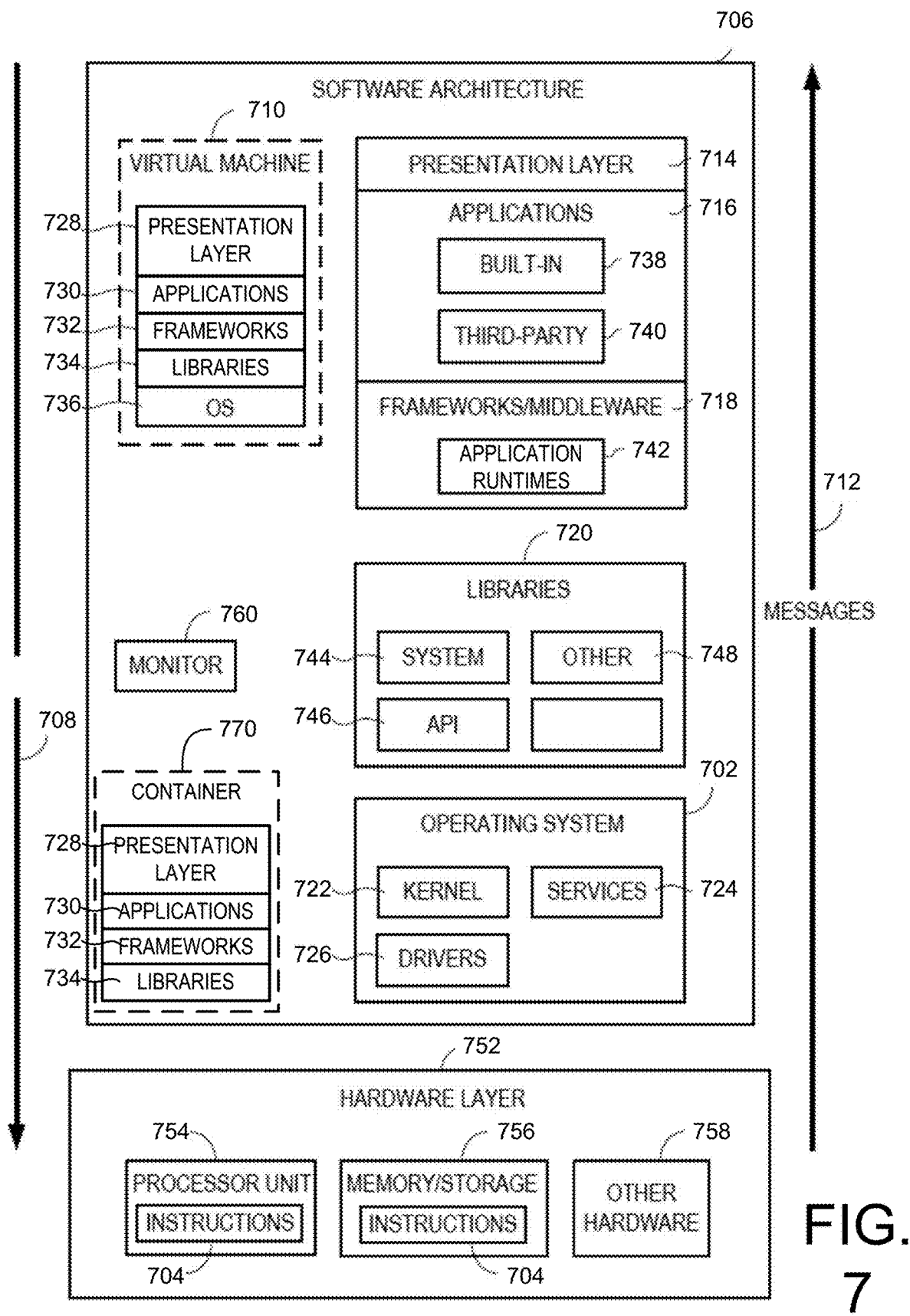
FIG. 7 is a block diagram illustrating a representative software architecture, which may be used in conjunction with various hardware architectures as described herein.

FIG. 7 is a block diagram illustrating an example software architecture 706, which may be used in conjunction with various hardware architectures herein described. FIG. 7 is a non-limiting example of a software architecture 706, and it will be appreciated that many other architectures may be implemented to facilitate the functionality described herein. The software architecture 706 may execute on hardware such as a machine 800 of FIG. 8 that includes, among other things, processors 804, memory/storage 806, and input/output (I/O) components 818. A representative hardware layer 752 is illustrated and can represent, for example, the machine 800 of FIG. 8. The representative hardware layer 752 includes a processor 754 having associated executable instructions 704. The executable instructions 704 represent the executable instructions of the software architecture 706, including implementation of the methods, components, and so forth described herein. The hardware layer 752 also includes non-transitory memory and/or storage modules as memory/storage 756, which also have the executable instructions 704. The hardware layer 752 may also include other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716 (such as the services of the processing system), and a presentation layer 714. Operationally, the applications 716 and/or other components within the layers may invoke API calls 708 through the software stack and receive a response as messages 712 in response to the API calls 708. The layers illustrated are representative in nature, and not all software architectures have all layers. For example, some mobile or special-purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide high-level resource management functions, web application frameworks, application runtimes 742 (e.g., a Java virtual machine or JVM), and so forth. The frameworks/middleware 718 may provide a broad spectrum of other APIs that may be utilized by the applications 716 and/or other software components/modules, some of which may be specific to a particular operating system or platform.

The applications 716 include built-in applications 738 and/or third-party applications 740. The applications 716 may use built-in operating system functions (e.g., kernel 722, services 724, and/or drivers 726), libraries 720, and frameworks/middleware 718 to create user interfaces to interact with users of the system. Alternatively, or additionally, in some systems, interactions with a user may occur through a presentation layer, such as the presentation layer 714. In these systems, the application/component "logic" can be separated from the aspects of the application/component that interact with a user.

Some software architectures use virtual machines. In the example of FIG. 7, this is illustrated by a virtual machine 710. The virtual machine 710 creates a software environment where applications/components can execute as if they were executing on a hardware machine (such as the machine 800 of FIG. 8, for example). The virtual machine 710 is hosted by a host operating system (e.g., the operating system 702 in FIG. 7) and typically, although not always, has a virtual machine monitor 760 (or hypervisor), which manages the operation of the virtual machine 710 as well as the interface with the host operating system (e.g., the operating system 702). A software architecture executes within the virtual machine 710 such as an operating system (OS) 736, libraries 734, frameworks 732, applications 730, and/or a presentation layer 728. These layers of software architecture executing within the virtual machine 710 can be the same as corresponding layers previously described or may be different.

Some software architectures use containers 770 or containerization to isolate applications. The phrase "container image" refers to a software package (e.g., a static image) that includes configuration information for deploying an application, along with dependencies such as software components, frameworks, or libraries that are required for deploying and executing the application. As discussed herein, the term "container" refers to an instance of a container image, and an application executes within an execution environment provided by the container. Further, multiple instances of an application can be deployed from the same container image (e.g., where each application instance executes within its own container). Additionally, as referred to herein, the term "pod" refers to a set of containers that accesses shared resources (e.g., network, storage), and one or more pods can be executed by a given computing node. A container 770 is similar to a virtual machine in that it includes a software architecture including libraries 734, frameworks 732, applications 730, and/or a presentation layer 728, but omits an operating system and, instead, communicates with the underlying host operating system 702.

Figure 8:
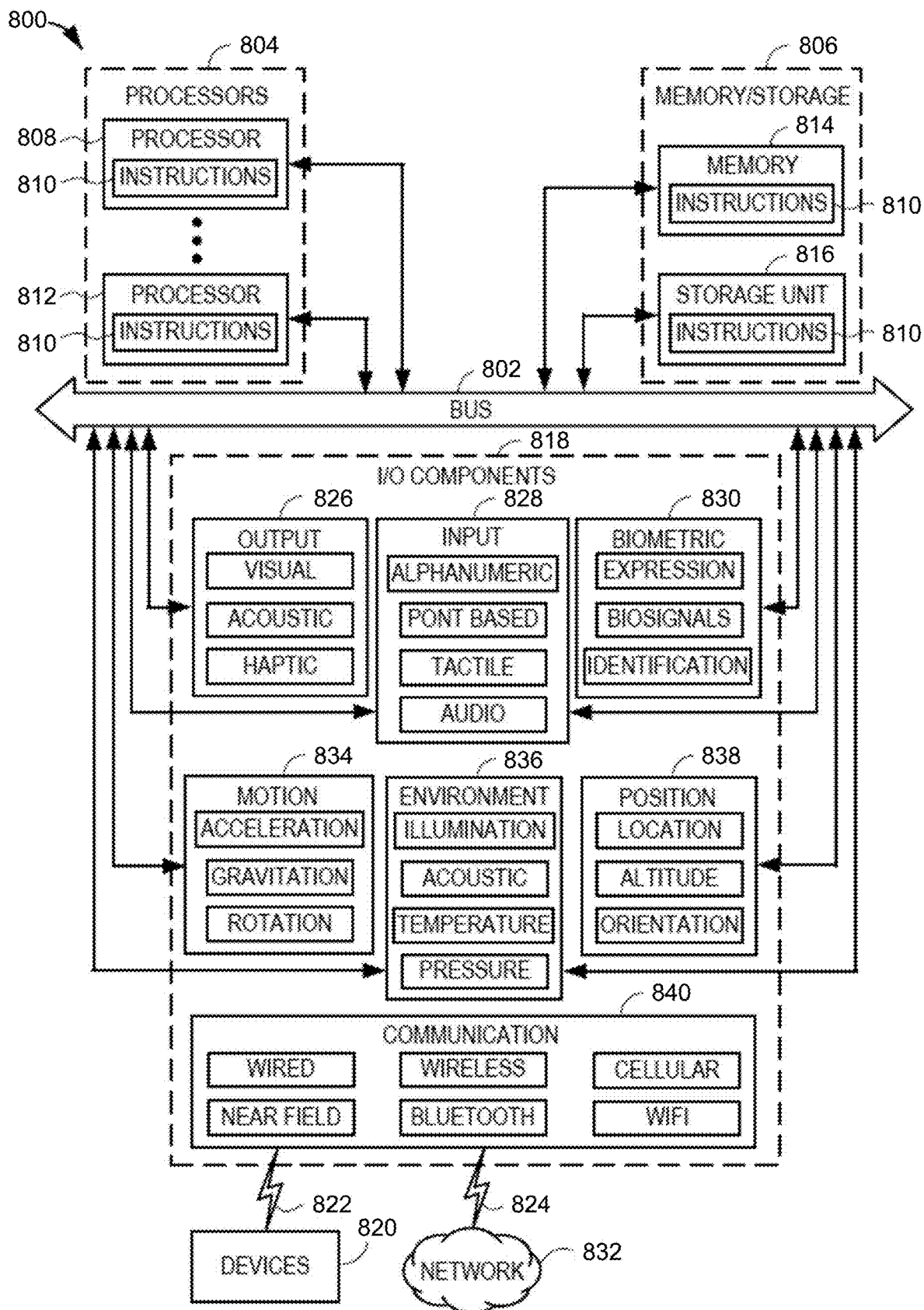
FIG. 8 is a block diagram illustrating components of a processing circuit or a processor, according to some example embodiments, configured to read instructions from a non-transitory computer-readable medium (e.g., a non-transitory machine-readable storage medium) and perform any one or more of the methods discussed herein.

FIG. 8 is a block diagram illustrating components of a machine 800, according to some example embodiments, able to read instructions from a non-transitory machine-readable medium (e.g., a computer-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or in parallel or concurrently, that specify actions to be taken by the machine 800. Further, while only a single machine 800 is illustrated, the term "machine" or "processing circuit" shall also be taken to include a collection of machines that individually or jointly execute the instructions 810 to perform any one or more of the methodologies discussed herein.

The machine 800 may include processors 804 (including processors 808 and 812), memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of the processors 804 are examples of machine-readable media.

The I/O components 818 may include a wide variety of components to receive input, provide output, produce output, transmit information, exchange information, capture measurements, and so on. The specific I/O components 818 that are included in a particular machine will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion, and the grouping is in no way limiting. In various example embodiments, the I/O components 818 may include output components 826 and input components 828. The output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environment components 836, or position components 838, among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via a coupling 824 and a coupling 822, respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geo-location, location via Wi-Fi® signal triangulation, location via detecting an NFC beacon signal that may indicate a particular location, and so forth.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art. Further, as used herein and in the claims, the phrase "at least one of element A, element B, or element C" is intended to convey any of: element A, element B, element C, elements A and B, elements A and C, elements B and C, and elements A, B, and C.

According to one or more embodiments, a method includes: receiving, by a proxy cryptocurrency wallet, a pre-authorization, from a user cryptocurrency wallet, corresponding to a transaction requested to be executed, the transaction specifying a digital asset to purchase, a price denominated in a cryptocurrency, and a payee cryptocurrency wallet, wherein the user cryptocurrency wallet is configured to allow for a pre-authorization of the transaction without a sufficient amount of cryptocurrency required for the transaction being present in the user cryptocurrency wallet; in response to receiving the pre-authorization for the transaction from the user cryptocurrency wallet, identifying if an amount of cryptocurrency in the proxy cryptocurrency wallet is sufficient to execute the transaction; and in response to identifying that the amount of cryptocurrency in the proxy cryptocurrency wallet is sufficient to execute the transaction, executing, by the proxy cryptocurrency wallet, the transaction resulting in a purchase of the digital asset, and a transfer of the digital asset to a recipient cryptocurrency wallet, the recipient cryptocurrency wallet being different from the proxy cryptocurrency wallet.

The method may further include: evaluating the transaction against one or more permissions associated with the user cryptocurrency wallet, and allowing the proxy cryptocurrency wallet to execute the transaction based on an evaluation that the transaction satisfies the one or more permissions. The method may further include computing a risk score associated with the payee cryptocurrency wallet, wherein the evaluating the transaction against the one or more permissions includes determining whether the risk score satisfies a threshold value to allow the transaction to be executed. The risk score may be computed based on prior transactions associated with the payee cryptocurrency wallet. The risk score may be further computed based on one or more of: the price; and the recipient cryptocurrency wallet.

The recipient cryptocurrency wallet may be the user cryptocurrency wallet.

The executing the transaction may include interacting with a smart contract associated with the digital asset. The proxy cryptocurrency wallet may allow for approval of the transaction based on receipt of an authorization message from a user associated with the user cryptocurrency wallet.

According to one embodiment of the present disclosure, a system includes: a processor; and memory storing instructions that, when executed by the processor, cause the processor to implement a proxy cryptocurrency wallet configured to: receive a pre-authorization from a user cryptocurrency wallet, the pre-authorization corresponding to a transaction requested to be executed, the transaction specifying a digital asset to purchase and a price denominated in a cryptocurrency, wherein the user cryptocurrency wallet is configured to allow for a pre-authorization of the transaction without a sufficient amount of cryptocurrency required for the transaction being present in the user cryptocurrency wallet; in response to receiving the pre-authorization for the transaction from the user cryptocurrency wallet, identify if an amount of cryptocurrency in the proxy cryptocurrency wallet is sufficient to execute the transaction; and in response to identifying that the amount of cryptocurrency in the proxy cryptocurrency wallet is sufficient to execute the transaction, execute the transaction resulting in a purchase of the digital asset and a transfer of the digital asset to a recipient cryptocurrency wallet, the recipient cryptocurrency wallet being different from the proxy cryptocurrency wallet.

The memory may further store instructions that, when executed by the processor, cause the processor to: evaluate the transaction against one or more permissions associated with the user cryptocurrency wallet, and allow the proxy cryptocurrency wallet to execute the transaction based on an evaluation that the transaction satisfies the one or more permissions.

The memory may further store instructions that, when executed by the processor, cause the processor to compute a risk score associated with a payee cryptocurrency wallet identified in the transaction, wherein the instructions to evaluate the transaction against the one or more permissions may include instructions to determine whether the risk score satisfies a threshold value to allow the transaction to be executed. The risk score may be computed based on prior transactions associated with the payee cryptocurrency wallet. The risk score may further be computed based on one or more of: the price; and the recipient cryptocurrency wallet.

The recipient cryptocurrency wallet may be the user cryptocurrency wallet.

The proxy cryptocurrency wallet may execute the transaction by interacting with a smart contract associated with the digital asset, and the proxy cryptocurrency wallet may allow for approval of the transaction based on receipt of an authorization message from a user associated with the user cryptocurrency wallet.

According to one embodiment of the present disclosure, a non-transitory computer-readable medium stores instructions that, when executed by a processor, cause the processor to implement a proxy cryptocurrency wallet configured to: receive a pre-authorization from a user cryptocurrency wallet, the pre-authorization corresponding to a transaction requested to be executed, the transaction specifying a digital asset to purchase and a price denominated in a cryptocurrency, wherein the user cryptocurrency wallet is configured to allow for a pre-authorization of the transaction without a sufficient amount of cryptocurrency required for the transaction being present in the user cryptocurrency wallet; in response to receiving the pre-authorization for the transaction from the user cryptocurrency wallet, identify if an amount of cryptocurrency in the proxy cryptocurrency wallet is sufficient to execute the transaction; in response to identifying that the amount of cryptocurrency in the proxy cryptocurrency wallet is insufficient to execute the transaction, purchase additional cryptocurrency for the transaction using a user account associated with the user cryptocurrency wallet; and execute the transaction when the purchase of the additional cryptocurrency is complete, resulting in a purchase of the digital asset and a transfer of the digital asset to a recipient cryptocurrency wallet, the recipient cryptocurrency wallet being different from the proxy cryptocurrency wallet.

The instructions to purchase the additional cryptocurrency for the transaction include instructions that, when executed by the processor, cause the processor to estimate a total cost of the transaction denominated in the cryptocurrency.

The instructions to estimate the total cost of the transaction may include instructions to: identify one or more precursor transactions to the pre-authorized transaction; compute padded exchange rates for the one or more precursor transactions; compute padded transaction fees for the one or more precursor transactions and the pre-authorized transaction; and compute a total estimated cost of the one or more precursor transactions and the pre-authorized transaction based on the padded exchange rates and the padded transaction fees. A padded exchange rate of the padded exchange rates may be computed based on a volatility of an exchange rate between two different cryptocurrencies, and a padded transaction fee of the padded transaction fees may be computed based on a volatility of transaction fees to execute a transaction in a corresponding cryptocurrency.

The non-transitory computer-readable medium may further store instructions that, when executed by the processor, cause the processor to: evaluate the transaction against one or more permissions associated with the user cryptocurrency wallet, and allow the proxy cryptocurrency wallet to execute the transaction based on an evaluation that the transaction satisfies the one or more permissions.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method for reducing delays and computing resources associated with blockchain transactions, the method comprising:

receiving, by a proxy cryptocurrency wallet, associated with a blockchain, hosted on one or more servers of a networked system, a pre-authorization cryptographically signed by a user cryptocurrency wallet supported by one or more of a web client or a client software application executed on a client device, corresponding to a transaction requested, using an interface, of the web client or the client software application, supported by a web server of the networked system, to be executed, the transaction specifying a digital asset to purchase, a price denominated in a cryptocurrency associated with the blockchain, and a payee cryptocurrency wallet, wherein the user cryptocurrency wallet is associated with the blockchain and has a user wallet address different from a proxy wallet address of the proxy cryptocurrency wallet;

authenticating, by a cryptocurrency transaction proxy service that uses the proxy cryptocurrency wallet and based on receiving the pre-authorization cryptographically signed by the user cryptocurrency wallet, the pre-authorization cryptographically signed by the user cryptocurrency wallet;

determining, using the one or more servers to access first information stored in one or more storage devices of the networked system, that the user cryptocurrency wallet lacks a sufficient amount of cryptocurrency required for the transaction based on one or more transactions associated with the user wallet address recorded on a distributed ledger of the blockchain;

identifying, by the proxy cryptocurrency wallet and using the one or more servers to access second information stored in the one or more storage devices of the networked system, that an amount of cryptocurrency in the proxy cryptocurrency wallet is insufficient to execute the transaction based on one or more transactions associated with the proxy wallet address recorded on the distributed ledger;

using an application programming interface (API) server of the system or the proxy cryptocurrency wallet to retrieve information regarding exchange rates from a third-party application of one or more third party servers; and in response to identifying that the amount of cryptocurrency in the proxy cryptocurrency wallet is insufficient to execute the transaction:

computing, based on retrieving the information regarding the exchange rates from the third-party application of the one or more third party servers, a padded exchange rate based on a volatility or a variance of exchange rates, associated with the cryptocurrency, over time; and purchasing, based on the padded exchange rate and without requiring a web interface to be visited using the client device, additional cryptocurrency using funds in a user account associated with the user cryptocurrency wallet; and executing, by the proxy cryptocurrency wallet and using the additional cryptocurrency, the transaction to purchase the digital asset on the blockchain, comprising recording the transaction on the distributed ledger with a recipient cryptocurrency wallet as a recipient of the digital asset, the recipient cryptocurrency wallet being different from the proxy cryptocurrency wallet.

2. The method of claim 1, further comprising:
evaluating the transaction against one or more permissions associated with the user cryptocurrency wallet, and
allowing the proxy cryptocurrency wallet to execute the transaction based on an evaluation that the transaction satisfies the one or more permissions.

3. The method of claim 2, further comprising computing a risk score associated with the payee cryptocurrency wallet,
wherein the evaluating the transaction against the one or more permissions comprises determining whether the risk score satisfies a threshold value to allow the transaction to be executed.

4. The method of claim 3, wherein the risk score is computed based on prior transactions associated with the payee cryptocurrency wallet.

5. The method of claim 3, wherein the risk score is further computed based on one or more of:
the price; and
the recipient cryptocurrency wallet.

6. The method of claim 1, wherein the recipient cryptocurrency wallet is the user cryptocurrency wallet.

7. The method of claim 1, wherein executing the transaction comprises interacting with a smart contract associated with the digital asset.

8. The method of claim 7, wherein the proxy cryptocurrency wallet approves the transaction in response to receipt of an authorization message.

9. The method of claim 1,
wherein the transaction is requested using a web interface, and
wherein the web interface is the interface of the web client.

10. The method of claim 1, further comprising:
computing a padded transaction fee that is a blockchain gas fee,
wherein purchasing the additional cryptocurrency comprises:
computing an estimated total cost to execute the transaction based on the padded exchange rate and the padded transaction fee, and
purchasing, based on the estimated total cost, the additional cryptocurrency.

11. The method of claim 1, further comprising:
identifying one or more precursor transactions that include purchasing of one or more intermediate cryptocurrencies based on the additional cryptocurrency not being purchasable using fiat currency,
wherein the padded exchange rate is for a transaction of the one or more precursor transactions, and
wherein purchasing the additional cryptocurrency comprises:
purchasing, based on the padded exchange rate, the one or more intermediate cryptocurrencies using funds in the user account associated with the user cryptocurrency wallet, and
purchasing the additional cryptocurrency using the one or more intermediate cryptocurrencies.

12. The method of claim 1, further comprising:
computing one or more other padded exchange rates for one or more precursor transactions, wherein the padded exchange rate is for the transaction; and
computing padded transaction fees for the one or more precursor transactions and the transaction,
wherein purchasing the additional cryptocurrency comprises:
computing an estimated total cost of the one or more precursor transactions and the transaction based on the padded exchange rate, the one or more other padded exchange rates, and the padded transaction fees, and
purchasing, based on the estimated total cost, the additional cryptocurrency.

13. A system comprising:
one or more processors; and
memory storing instructions that, when executed by the one or more processors, cause the one or more processors to:
receive, using a proxy cryptocurrency wallet hosted on one or more servers of the system, a pre-authorization cryptographically signed by a user cryptocurrency wallet supported by one or more of a web client or a client software application executed on a client device,
the pre-authorization corresponding to a transaction requested to be executed, and
the transaction specifying a digital asset to purchase and a price denominated in a cryptocurrency,
wherein the user cryptocurrency wallet is associated with a blockchain and has a user wallet address different from a proxy wallet address of the proxy cryptocurrency wallet;
authenticate, based on receiving the pre-authorization for the transaction and based on receiving the pre-authorization cryptographically signed by the user cryptocurrency wallet, the pre-authorization cryptographically signed by the user cryptocurrency wallet;
identify, using the one or more servers to access first information stored in one or more storage devices of the system, that an amount of cryptocurrency associated with the proxy cryptocurrency wallet is insufficient to execute the transaction based on one or more transactions associated with the proxy wallet address recorded on a distributed ledger of the blockchain;
use an application programming interface (API) server of the system or the proxy cryptocurrency wallet to retrieve information regarding exchange rates from a third-party application of one or more third party servers; and
based on identifying that the amount of cryptocurrency in the proxy cryptocurrency wallet is insufficient to execute the transaction:
  determine, after retrieving the information regarding the exchange rates from the third-party application of the one or more third party servers and based on a volatility or a variance of exchange rates, associated with the cryptocurrency, over time, a padded exchange rate;
  purchase, based on the padded exchange rate and without requiring a web interface to be visited using the client device, additional cryptocurrency for the transaction using funds in a user account associated with the user cryptocurrency wallet; and
  execute the transaction to purchase the digital asset using the additional cryptocurrency complete, comprising recording the transaction on the distributed ledger with a recipient cryptocurrency wallet as a recipient of the digital asset, the recipient cryptocurrency wallet being different from the proxy cryptocurrency wallet.

14. The system of claim 13, wherein the memory further stores instructions that, when executed by the one or more processors, cause the one or more processors to:
evaluate the transaction against one or more permissions associated with the user cryptocurrency wallet, and
allow the proxy cryptocurrency wallet to execute the transaction based on an evaluation that the transaction satisfies the one or more permissions.

15. The system of claim 14,
wherein the memory further stores instructions that, when executed by the one or more processors, cause the one or more processors to compute a risk score associated with a payee cryptocurrency wallet identified in the transaction, and
wherein the instructions to evaluate the transaction against the one or more permissions comprise instructions to determine whether the risk score satisfies a threshold value to allow the transaction to be executed.

16. The system of claim 15, wherein the risk score is computed based on prior transactions associated with the payee cryptocurrency wallet.

17. The system of claim 15, wherein the risk score is further computed based on one or more of:
the price; and
the recipient cryptocurrency wallet.

18. The system of claim 13, wherein the recipient cryptocurrency wallet is the user cryptocurrency wallet.

19. The system of claim 13, wherein the proxy cryptocurrency wallet executes the transaction by interacting with a smart contract associated with the digital asset, and
wherein the proxy cryptocurrency wallet approves the transaction in response to an authorization message from a user associated with the user cryptocurrency wallet.

20. One or more non-transitory computer-readable media storing instructions that, when executed by a one or more servers, cause the one or more servers to:
receive, using a proxy cryptocurrency wallet hosted on the one or more servers, a pre-authorization cryptographically signed by a user cryptocurrency wallet supported by one or more of a web client or a client software application executed on a client device, the pre-authorization corresponding to a transaction requested to be executed, and the transaction specifying a digital asset to purchase and a price denominated in a cryptocurrency, wherein the user cryptocurrency wallet is associated with a blockchain and has a user wallet address different from a proxy wallet address of the proxy cryptocurrency wallet;
identify, using the one or more servers to access first information stored in one or more storage devices associated with the one or more servers, that an amount of cryptocurrency associated with the proxy cryptocurrency wallet is insufficient to execute the transaction based on one or more transactions associated with the proxy wallet address recorded on a distributed ledger of the blockchain;
use an application programming interface (API) server of the one or more servers or the proxy cryptocurrency wallet to retrieve information regarding exchange rates from a third-party application of one or more third party servers; and
based on identifying that the amount of cryptocurrency in the proxy cryptocurrency wallet is insufficient to execute the transaction:
  determine a padded exchange rate after retrieving the information regarding the exchange rates from the third-party application of the one or more third party servers and based on a volatility or a variance of exchange rates, associated with the cryptocurrency, over time;
  purchase, based on the padded exchange rate and without requiring a web interface to be visited using the client device, additional cryptocurrency for the transaction using funds in a user account associated with the user cryptocurrency wallet; and
  execute the transaction to purchase the digital asset using the additional cryptocurrency, comprising recording the transaction on the distributed ledger with a recipient cryptocurrency wallet as a recipient of the digital asset, the recipient cryptocurrency wallet being different from the proxy cryptocurrency wallet.

* * * * *